(12) United States Patent
Minefuji

(10) Patent No.: US 7,855,840 B2
(45) Date of Patent: Dec. 21, 2010

(54) PROJECTION ZOOM LENS AND PROJECTION TYPE IMAGE DISPLAY DEVICE

(75) Inventor: Nobutaka Minefuji, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 12/698,520

(22) Filed: Feb. 2, 2010

(65) Prior Publication Data

US 2010/0208358 A1    Aug. 19, 2010

(30) Foreign Application Priority Data

Feb. 16, 2009    (JP) .............................. 2009-032364

(51) Int. Cl.
    *G02B 15/14*    (2006.01)
(52) U.S. Cl. .................... 359/682; 359/649; 359/680; 359/683; 359/684; 359/685; 359/714; 359/740; 359/753; 359/770
(58) Field of Classification Search ................. 359/649, 359/680, 682–685, 714, 740, 753, 770
    See application file for complete search history.

(56) References Cited

U.S. PATENT DOCUMENTS

| | | | |
|---|---|---|---|
| 6,587,279 B2 * | 7/2003 | Narimatsu et al. .......... | 359/683 |
| 6,816,320 B2 * | 11/2004 | Wada .......................... | 359/683 |
| 7,190,528 B2 * | 3/2007 | Inoko .......................... | 359/649 |
| 7,227,693 B2 | 6/2007 | Nakazawa et al. | |
| 7,403,339 B2 * | 7/2008 | Inoko .......................... | 359/680 |
| 7,576,923 B2 * | 8/2009 | Inoko .......................... | 359/680 |
| 2008/0316616 A1 * | 12/2008 | Kawana ...................... | 359/683 |
| 2009/0195884 A1 * | 8/2009 | Inoko .......................... | 359/682 |

FOREIGN PATENT DOCUMENTS

| JP | A-2001-91829 | 4/2001 |
|---|---|---|
| JP | A-2003-202498 | 7/2003 |
| JP | A-2004-109896 | 4/2004 |
| JP | A-2004-325699 | 11/2004 |
| JP | A-2005-156963 | 6/2005 |
| JP | A-2006-65249 | 3/2006 |

* cited by examiner

*Primary Examiner*—Evelyn A. Lester
(74) *Attorney, Agent, or Firm*—Oliff & Berridge, PLC

(57) ABSTRACT

A projection zoom lens includes in order from an enlargement side: a first lens group with negative power; a second lens group with positive power; a third lens group with positive power; a fourth lens group with positive power; and a fifth lens group with positive power, wherein the first and fifth lens groups are fixed and the second, third, and fourth lens groups move when zooming from a wide angle side to a telescopic side, the second lens group includes only a positive lens which is convex toward the enlargement side, and assuming that the focal length at a wide angle end of a whole system including the first to fifth lens groups is F and the focal length of the second lens group is F2, the following conditional expression (1) is satisfied:

$0.05 < F/F2 < 0.23$    (1).

14 Claims, 14 Drawing Sheets

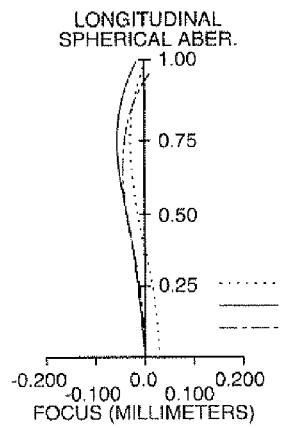
FIG. 3A
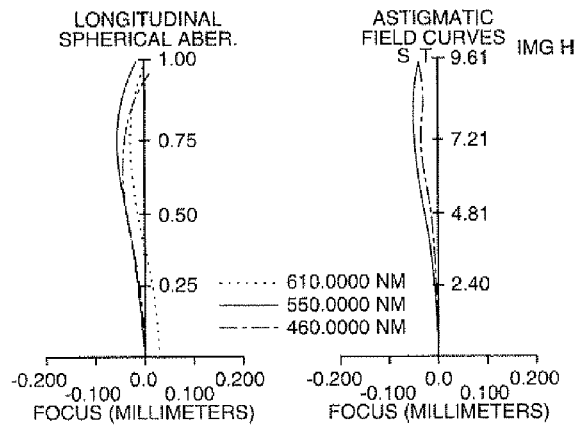
FIG. 3B
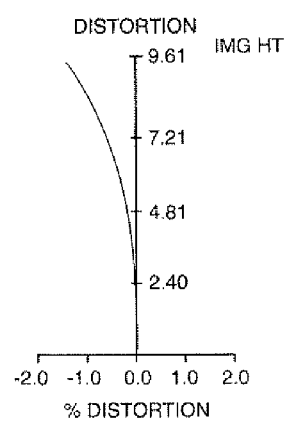
FIG. 3C
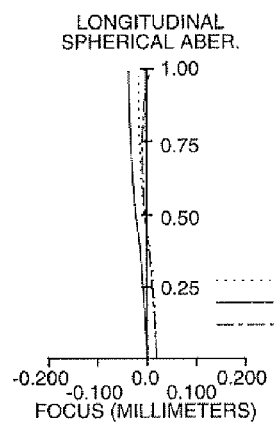
FIG. 3D
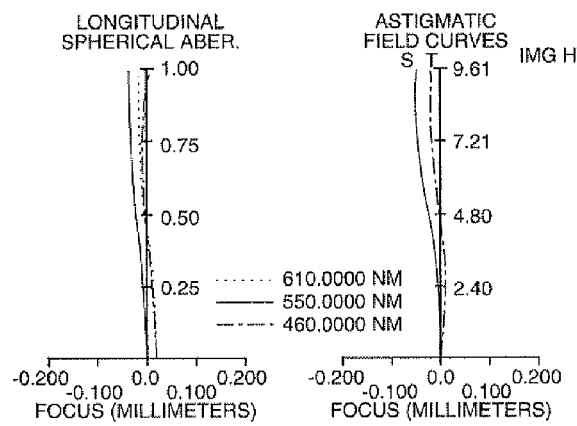
FIG. 3E
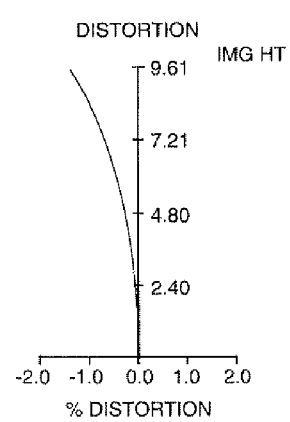
FIG. 3F
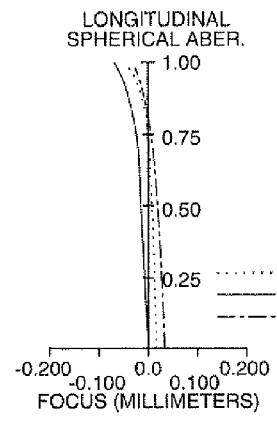
FIG. 3G
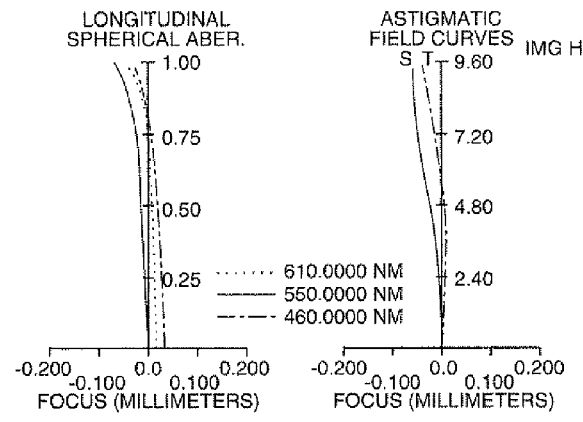
FIG. 3H
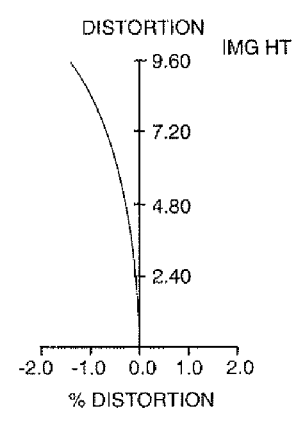
FIG. 3I
FIG. 3

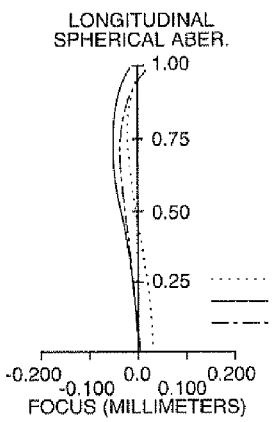
FIG. 5A
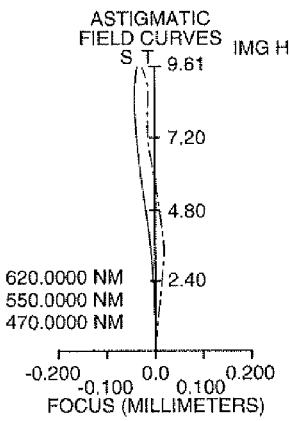
FIG. 5B
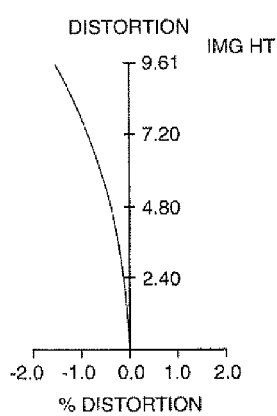
FIG. 5C
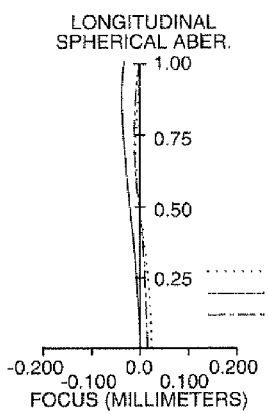
FIG. 5D
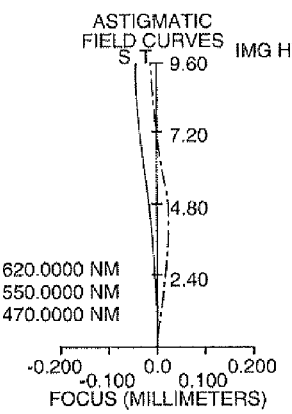
FIG. 5E
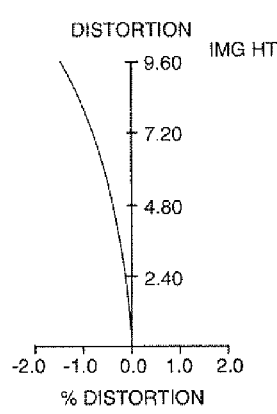
FIG. 5F
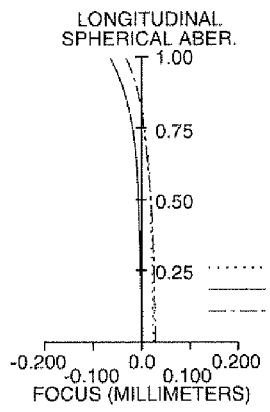
FIG. 5G
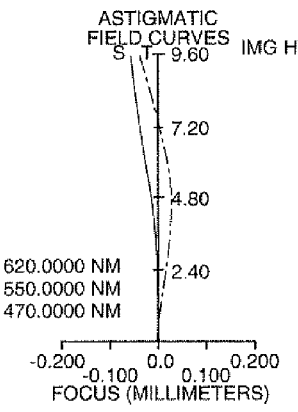
FIG. 5H
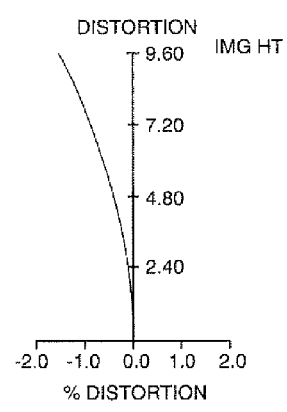
FIG. 5I
FIG. 5

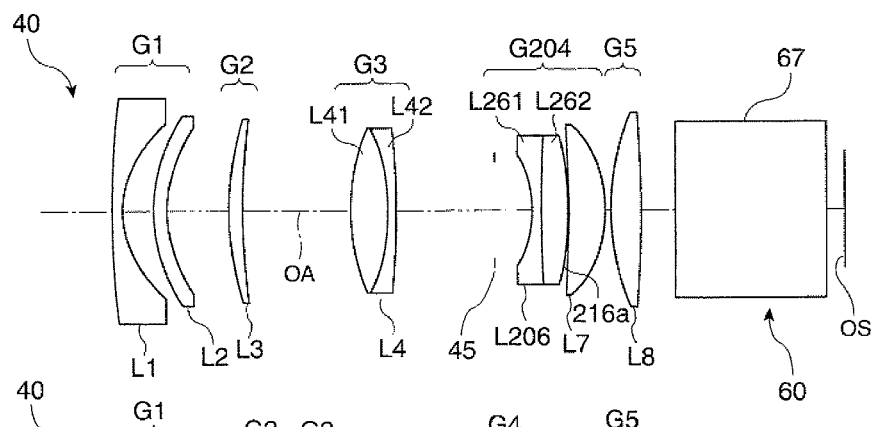
FIG. 7A
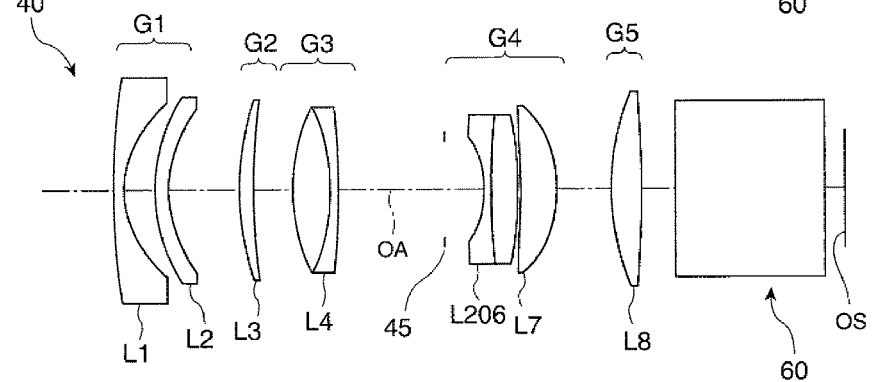
FIG. 7B
FIG. 7

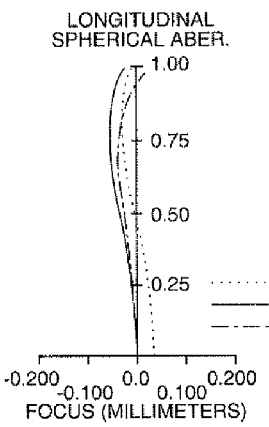
FIG. 8A
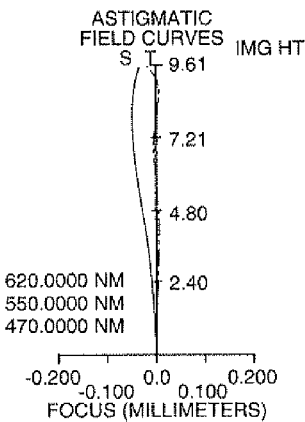
FIG. 8B
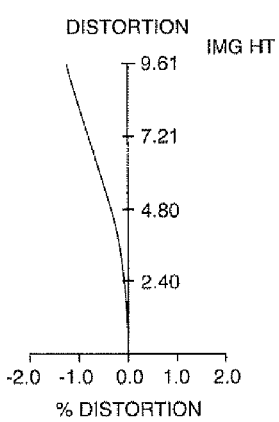
FIG. 8C
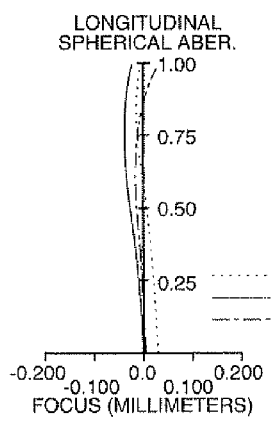
FIG. 8D
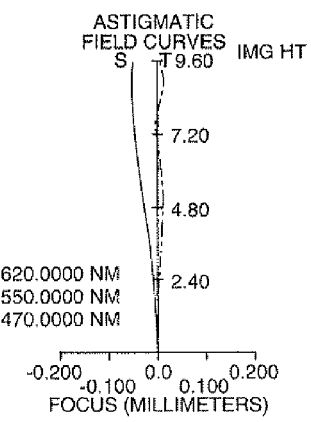
FIG. 8E
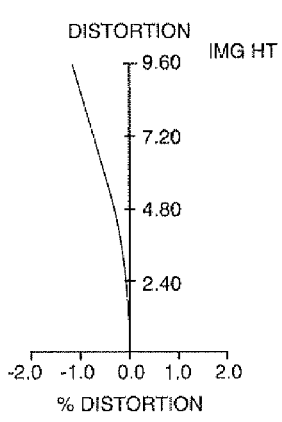
FIG. 8F
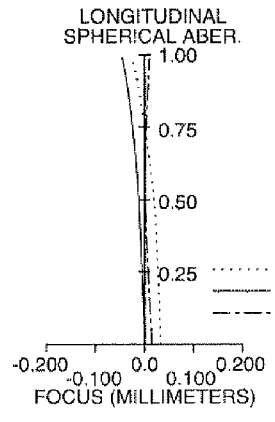
FIG. 8G
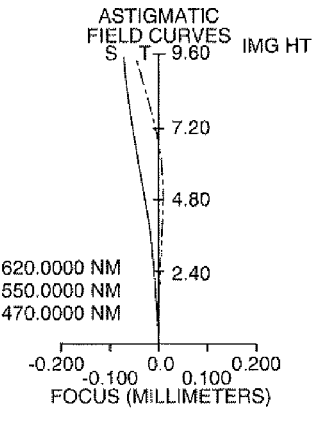
FIG. 8H
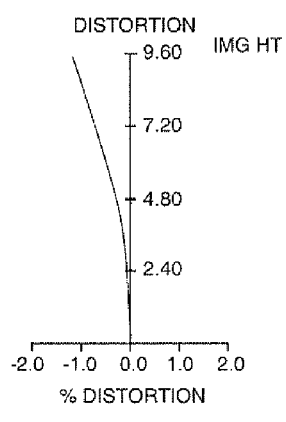
FIG. 8I
FIG. 8

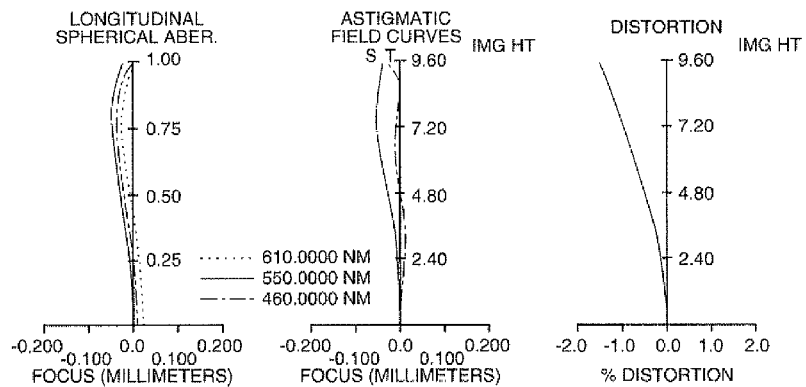
FIG. 12A  FIG. 12B  FIG. 12C
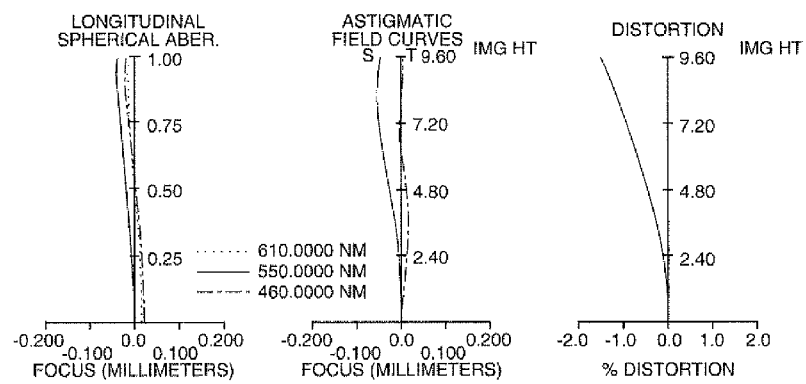
FIG. 12D  FIG. 12E  FIG. 12F
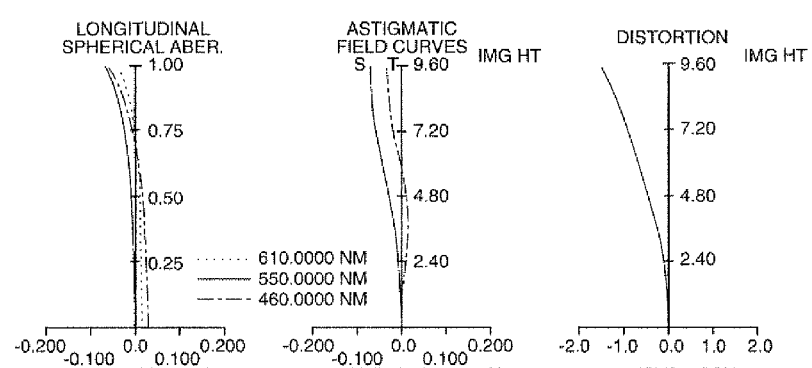
FIG. 12G  FIG. 12H  FIG. 12I
FIG. 12

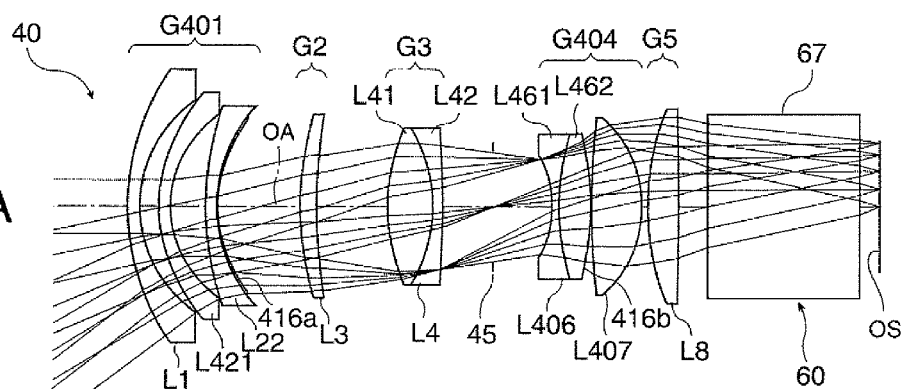
FIG. 13A
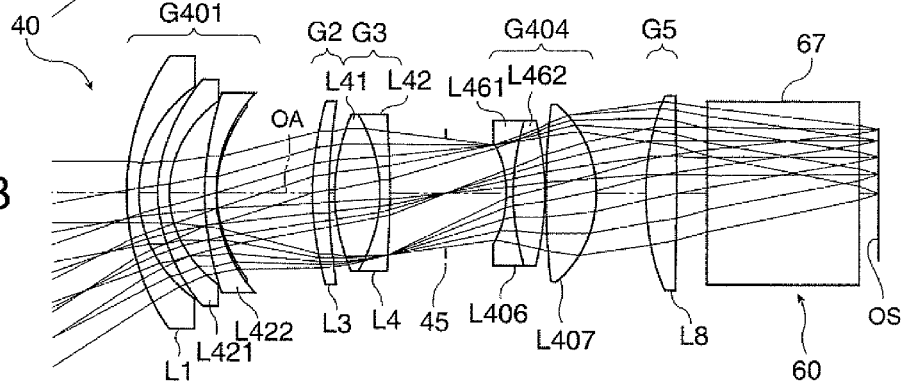
FIG. 13B
FIG. 13

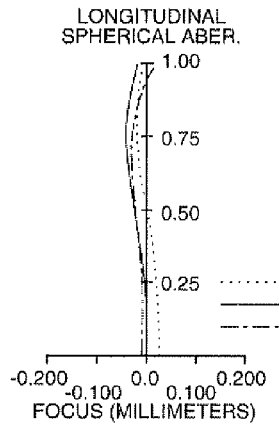
FIG. 14A
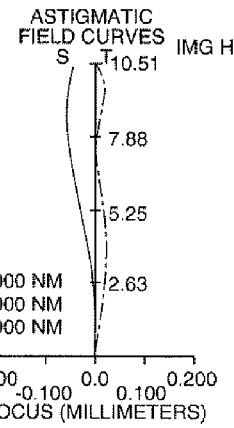
FIG. 14B
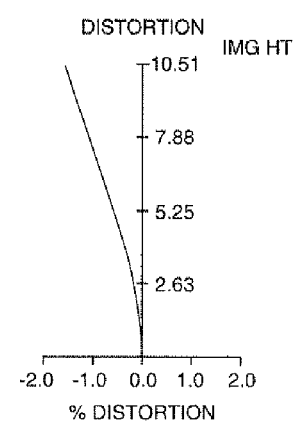
FIG. 14C
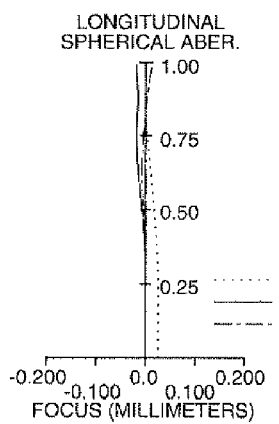
FIG. 14D
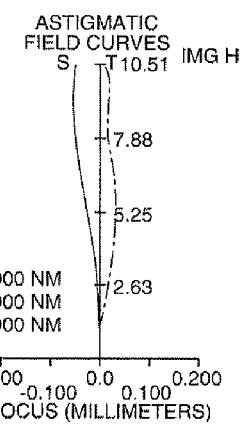
FIG. 14E
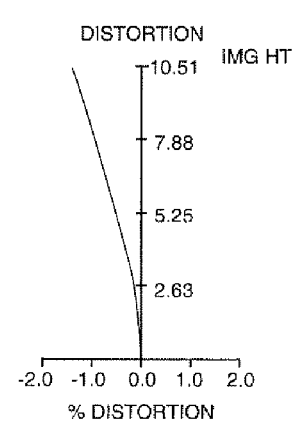
FIG. 14F
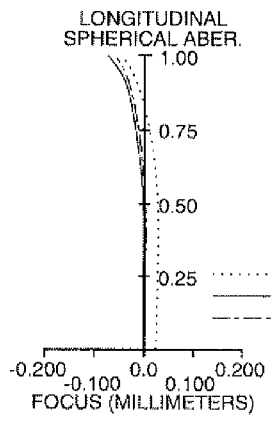
FIG. 14G
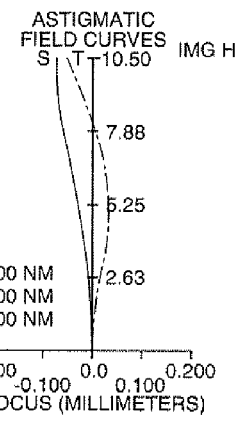
FIG. 14H
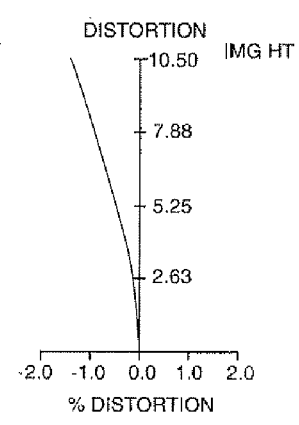
FIG. 14I
FIG. 14

PROJECTION ZOOM LENS AND PROJECTION TYPE IMAGE DISPLAY DEVICE

BACKGROUND

1. Technical Field

The present invention relates to a projection zoom lens for projecting an image, which is formed by a liquid crystal panel or the like, onto a screen and a projection type image display device including the projection zoom lens.

2. Related Art

There is a projection zoom lens which combines images from three liquid crystal panels by a prism and projects the combined images in an enlarged manner, for example. For such a projection zoom lens, a long back focus for arranging a color combining prism, good telecentricity for preventing the color unevenness, and a small F number for efficiently achieving the light from an illumination system are demanded. Furthermore, not only the above characteristics but also a low price is demanded in recent years. Examples of a projection zoom lens that meets such demands to some extent include a projection zoom lens which includes five lens groups and which has a variable power ratio of about 1.2 (refer to JP-A-2001-091829, JP-A-2004-325699, and JP-A-2006-065249).

However, although the projection zoom lens disclosed in JP-A-2001-091829 has an angle of view equivalent to a half angle of view of about 28° using about ten lenses, the aperture ratio is about 1:2.0. Accordingly, since the F number is large, the image is dark.

In the case of the projection zoom lens disclosed in JP-A-2004-325699, the aperture ratio is 1:1.74. Accordingly, since the F number is small for this kind of zoom lens, the image is relatively bright. Moreover, since nine lenses are used, the price is low. However, the half angle of view is only about 27°.

In the case of the projection zoom lens disclosed in JP-A-2006-065249, the aperture ratio is 1:1.55. Accordingly, since the F number is small, the image is relatively bright. Moreover, since the half angle of view is about 30°, a wide angle of view is realized. However, the number of lenses is 14 or 15, which is large. For this reason, the condition of a low price is not satisfied.

Thus, it was not easy to obtain a projection zoom lens that satisfies the three conditions, that is, a projection zoom lens which has a relatively wide angle of view, which is a bright optical system with a small F number, and which is low cost since the lens configuration is simple.

In recent years, a projection zoom lens capable of acquiring sufficient contrast even in a bright place and of obtaining a bright image by further reducing the F number according to miniaturization of an image display device, such as a liquid crystal panel, has been demanded. Moreover, in order to make a projector small or low cost, it is also becoming an important issue to reduce the cost of a projection zoom lens by miniaturizing the projection zoom lens or reducing the number of constituent lenses.

SUMMARY

An advantage of some aspects of the invention is that it provides a projection zoom lens which satisfies the conditions, that is, a projection zoom lens which has a relatively wide angle of view, which is a bright optical system with a small F number, and which is low cost since the lens configuration is simple.

Another advantage of some aspects of the invention is that it provides a projection type image display device including the above-described projection zoom lens.

According to an aspect of the invention, there is provided a projection zoom lens including, in order from an enlargement side, a first lens group with negative power, a second lens group with positive power, a third lens group with positive power, a fourth lens group with positive power, and a fifth lens group with positive power. The first and fifth lens groups are fixed and the second, third, and fourth lens groups move when zooming from a wide angle side to a telescopic side. The second lens group includes only a positive lens which is convex toward the enlargement side. Assuming that the focal length at a wide angle end of a whole system including the first to fifth lens groups is F and the focal length of the second lens group is F2, the following conditional expression (1) is satisfied.

$$0.05 < F/F2 < 0.23 \qquad (1)$$

The projection zoom lens described above may be considered as a two-group zoom by treating a pair of the first and second lens groups as a negative first composite lens group, which is disposed at the enlargement side, and treating the third and fourth lens groups as a positive second composite lens group, which is disposed at the reduction side. That is, the projection zoom lens basically functions as a so-called two-group zoom which changes the magnification by changing the distance between the two composite lens groups. Moreover, in the projection zoom lens, high resolving power, a small F number, and an increase in the amount of ambient light are realized by changing the distance between the first and second lens groups and the distance between the third and fourth lens groups in order to finely correct fluctuations in spherical aberration, coma aberration, and astigmatism at the time of magnification change. In the projection zoom lens, the fifth lens group acts as a lens group for obtaining good telecentricity. Accordingly, the occurrence of color unevenness in the color combining prism can be suppressed. Moreover, in the negative first composite lens group, from the necessity of simplifying the lens frame configuration in which the first lens group has a function as a focus group, the first lens group is fixed and the second lens group moves when zooming. The movement of the second lens group when zooming also serves to correct the focus shift caused by the movement of the third and fourth lens groups with main magnification change functions when zooming.

When the configuration and operations described above are assumed, it is possible to provide a projection zoom lens which maintains high resolving power while realizing a bright F number by setting the second lens group to have relatively weak positive power and setting it within the range of the conditional expression (1). Here, the conditional expression (1) is a condition regarding the power of the second lens group. Moreover, the conditional expression (1) is a condition for obtaining the sufficient brightness for a projection optical system, for performing well-balanced correction of coma aberration, astigmatism, chromatic aberration, and the like, and for suppressing fluctuations in these aberrations to be small when zooming from the wide angle end to the telescopic end.

If the upper limit of the conditional expression (1) is exceeded, the positive power of the second lens group becomes too strong. In this case, it becomes difficult to perform well-balanced correction of coma aberration, astigmatism, and the like, and it becomes difficult to form the second lens group with one positive lens.

On the contrary, if it is less than the lower limit of the conditional expression (1), the power of the second lens group becomes too small. In this case, since the amount of movement of the second lens group becomes too large at the time of magnification change, it becomes difficult to reduce the fluctuations in the chromatic aberration and the like when zooming.

In the projection zoom lens according to the aspect of the invention, it is preferable that the first lens group includes only negative lenses, and at least two, which are convex toward the enlargement side. Moreover, preferably, assuming that the focal length of the first lens group is F1, the following conditional expression (2) is satisfied.

$$0.12<|F1/F2|<0.30 \quad (2)$$

In this case, since the first lens group includes only a plurality of negative lenses, it is necessary to suppress the occurrence of a chromatic aberration in the screen periphery within the composite group of the negative first lens group and the positive second lens group. In addition, the first lens group has strong negative power in order to ensure the wide angle of view and the long back focus. However, due to the positive power of the second lens group, it is necessary to suppress the occurrence of distortion, coma aberration, and the like which occur within the first and second lens groups. The conditional expression (2) is for meeting the above requests. That is, the conditional expression (2) is a condition regarding the ratio of the focal length of the first lens group and the focal length of the second lens group. By distributing the power of the first lens group and the power of the second lens group appropriately within the range of the conditional expression (2), it is possible to obtain an image surface which is flat and has a wide angle of view while maintaining the sufficient negative power for obtaining the sufficient back focus. As a result, it becomes possible to suppress the chromatic aberration of magnification, which easily occurs in a projection optical system with a wide angle of view, to be small and to correct satisfactorily the distortion and the coma aberration in a region with a wide angle of view.

In addition, if the upper limit of the conditional expression (2) is exceeded, the positive power of the second lens group becomes too strong compared with the power of the first lens group. In this case, since it becomes difficult to perform well-balanced correction of coma aberration or distortion, it is difficult to form the second lens group with one positive lens.

In addition, if it is less than the lower limit of the conditional expression (2), the power of the second lens group becomes too weak. In this case, it becomes difficult to correct the chromatic aberration of magnification, which occurs in the first lens group, by the second lens group.

In the projection zoom lens according to the aspect of the invention, it is preferable that the third lens group includes a doublet lens formed by a biconvex positive lens and a negative lens. Moreover, preferably, assuming that the focal length of the third lens group is F3, the following conditional expression (3) is satisfied.

$$0.2<F3/F2<0.5 \quad (3)$$

In this case, diverging light passing through the third lens group can be guided to the fourth lens group by the strong positive power of the third lens group. In addition, by adopting such a doublet lens, an error at the time of manufacture can be prevented. Here, the conditional expression (3) is a condition regarding the ratio of the focal length of the second lens group and the focal length of the third lens group. By setting the power of the second lens group and the power of the third lens group within the range of the conditional expression (3), well-balanced correction of coma aberration, astigmatism, and the like can be performed.

In addition, if the upper limit of the conditional expression (3) is exceeded, the power of the third lens group becomes too weak. In this case, it becomes difficult to perform well-balanced correction of astigmatism and the like.

In addition, if it is less than the lower limit of the conditional expression (3), the positive power of the third lens group becomes too strong. In this case, the effect of aberration correction in the first and second lens groups becomes weak. As a result, color flare and the like become worse in the screen periphery. In addition, if the positive power of the third lens group becomes too strong, it becomes difficult to form the third lens group with two doublet lenses formed by positive and negative lenses. This is not preferable in terms of a decrease in sensitivity and cost reduction.

In the projection zoom lens according to the aspect of the invention, it is preferable that the fourth lens group includes at least one negative lens and two positive lenses in order from the enlargement side, a surface at the furthest enlargement side being concave toward the enlargement side and a surface at the furthest reduction side being convex toward the reduction side. Moreover, preferably, the fourth lens group includes a doublet lens and has at least one aspheric surface. In this case, for example, by forming the concave surface at the furthest enlargement side or the convex surface at the furthest reduction side as an aspheric surface, a spherical aberration and a coma aberration can be effectively prevented.

In the projection zoom lens according to the aspect of the invention, preferably, assuming that the composite focal length of the third and fourth lens groups at the wide angle end is F34, the following conditional expression (4) is satisfied.

$$0.2<F/F34<0.4 \quad (4)$$

As described above, the third and fourth lens groups mainly serve to change the magnification when zooming. Here, the conditional expression (4) is a condition regarding the composite power of the third and fourth lens groups. By setting it within the range of the conditional expression (4), the projection zoom lens can be made as a bright and small optical system.

In addition, if the upper limit of the conditional expression (4) is exceeded, the composite positive power of the third and fourth lens groups becomes too strong. In this case, a spherical aberration and an off-axis coma aberration become worse, and coma flare increases in the whole screen. Accordingly, it becomes difficult to obtain a bright F number and to ensure a sufficient amount of ambient light.

In addition, if it is less than the lower limit of the conditional expression (4), the composite positive power of the third and fourth lens groups becomes too weak. In this case, the amount of movement of the third and fourth lens groups when zooming becomes large and this is not preferable in terms of miniaturization. In addition, since the amount of movement of the diaphragm position at the telescopic end with respect to the wide angle end increases, the F number at the telescopic end becomes large and this is not preferable.

In the projection zoom lens according to the aspect of the invention, it is preferable that among a plurality of negative lenses included in the first lens group, a reduction-side negative lens located at the furthest reduction side is formed including a resin material and has at least one aspheric surface. Moreover, preferably, assuming that the composite focal length of an enlargement-side negative lens portion including at least one negative lens, which is disposed closer to the enlargement side than is the reduction-side lens, is Fs and the focal length of the reduction-side negative lens is Fa, the following conditional expression (5) is satisfied.

$$0.2 < Fs/Fa < 0.5 \quad (5)$$

In this case, since the reduction-side negative lens has an aspheric surface formed of a resin material, a distortion can be suppressed to be small. In addition, by providing such an aspheric surface on the reduction-side negative lens, it is possible to suppress the influence of environmental changes. In the case of a lens formed of a resin material, a coefficient of linear expansion or a refractive index temperature coefficient is one order larger than that of a lens formed of a glass material. Accordingly, shift of the focusing position, which is caused by change of the surface shape or a change in the internal refractive index, or the performance degradation caused by partial change in the internal refractive index occurring due to the water absorbability of the resin, that is, due to absorption of moisture of the resin, may cause a problem. Since the resin lens has such a disadvantage, it is preferable to keep the incidence angle of a light beam on each surface from becoming large by weakening the power and adopting the meniscus shape with a convex surface toward the enlargement side. Here, the conditional expression (5) is a condition when the aspheric surface in the first lens group is formed of a resin. By restricting the power of the reduction-side negative lens, which has an aspheric surface formed of a resin, within the range of the conditional expression (5) compared with the power of the enlargement-side negative lens portion including the other lenses, the influence of environmental changes can be prevented while maintaining the good performance.

In addition, if the upper limit of the conditional expression (5) is exceeded, the negative power of the reduction-side negative lens having an aspheric surface formed of a resin becomes too strong. In this case, it becomes easy to receive the influence of environmental changes, such as the temperature and the humidity, and this becomes a cause of movement of the focusing position or a curvature of field.

In addition, if it is less than the lower limit of the conditional expression (5), the negative power of the reduction-side negative lens having an aspheric surface formed of a resin becomes too weak. In this case, although it becomes strong against the environmental changes, the load of the negative power of the enlargement-side negative lens portion including the other lenses becomes too large. As a result, the degree of distortion increases especially in the outer frame portion of the screen at the wide angle end.

In the projection zoom lens according to the aspect of the invention, it is preferable that the reduction-side negative lens included in the first lens group is a composite aspheric lens in which a resin layer is formed on a concave optical surface of a spherical lens formed of a glass material. In this case, the influence of environmental changes can be further reduced.

Furthermore, according to another aspect of the invention, a projection type image display device includes the projection zoom lens described above and an image forming optical unit provided before the projection zoom lens on an optical path.

In the projection type image display device, since the above-described projection zoom lens is provided, a bright image in which an aberration is suppressed can be projected onto the screen while ensuring a relatively wide angle of view.

In addition, a compact projection type image display device realized by miniaturization of the whole system.

BRIEF DESCRIPTION OF THE DRAWINGS

The invention will be described with reference to the accompanying drawings, wherein like numbers reference like elements.

FIGS. 3A to 3C are views showing a spherical aberration, an astigmatism, and a distortion at the wide angle end in the first specific example.

FIGS. 3D to 3F are views showing the spherical aberration, the astigmatism, and the distortion at the intermediate focal length.

FIGS. 3G to 3I are views showing the spherical aberration, the astigmatism, and the distortion at the telescopic end.

FIGS. 5A to 5C are views showing a spherical aberration, an astigmatism, and a distortion at the wide angle end in the second specific example.

FIGS. 5D to 5F are views showing the spherical aberration, the astigmatism, and the distortion at the intermediate focal length.

FIGS. 5G to 5I are views showing the spherical aberration, the astigmatism, and the distortion at the telescopic end.

FIGS. 7A and 7B are views explaining the configuration of a projection zoom lens according to a second embodiment through a third specific example.

FIGS. 8A to 8C are views showing a spherical aberration, an astigmatism, and a distortion at the wide angle end in the third specific example.

FIGS. 8D to 8F are views showing the spherical aberration, the astigmatism, and the distortion at the intermediate focal length.

FIGS. 8G to 8I are views showing the spherical aberration, the astigmatism, and the distortion at the telescopic end.

FIGS. 12A to 12C are views showing a spherical aberration, an astigmatism, and a distortion at the wide angle end in the fifth specific example.

FIGS. 12D to 12F are views showing the spherical aberration, the astigmatism, and the distortion at the intermediate focal length.

FIGS. 12G to 12I are views showing the spherical aberration, the astigmatism, and the distortion at the telescopic end.

FIGS. 13A and 13B are views explaining the configuration of a projection zoom lens according to a fourth embodiment through a sixth specific example.

FIGS. 14A to 14C are views showing a spherical aberration, an astigmatism, and a distortion at the wide angle end in the sixth specific example.

FIGS. 14D to 14F are views showing the spherical aberration, the astigmatism, and the distortion at the intermediate focal length.

FIGS. 14G to 14I are views showing the spherical aberration, the astigmatism, and the distortion at the telescopic end.

DESCRIPTION OF EXEMPLARY EMBODIMENTS

First Embodiment

Figure 1:
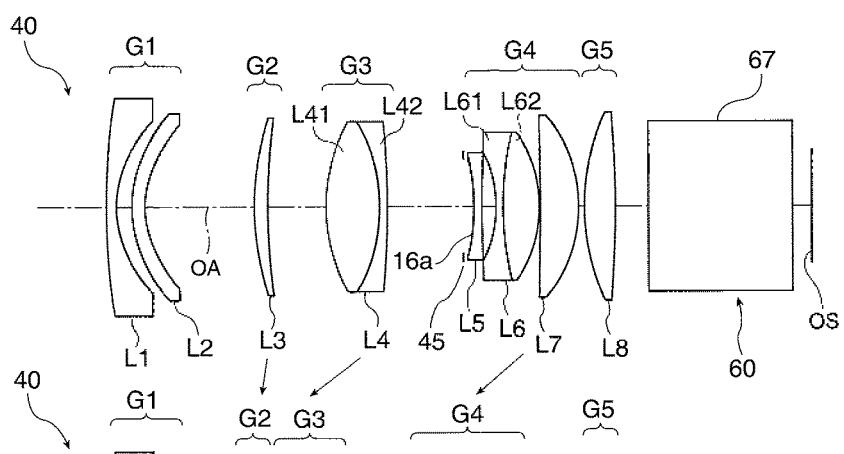
FIGS. 1A and 1B are views explaining the configuration of a projection zoom lens according to a first embodiment through a first specific example.
Figure 1:
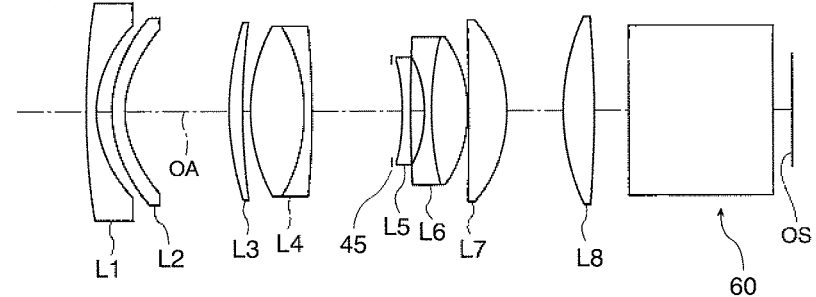
Figure 2:
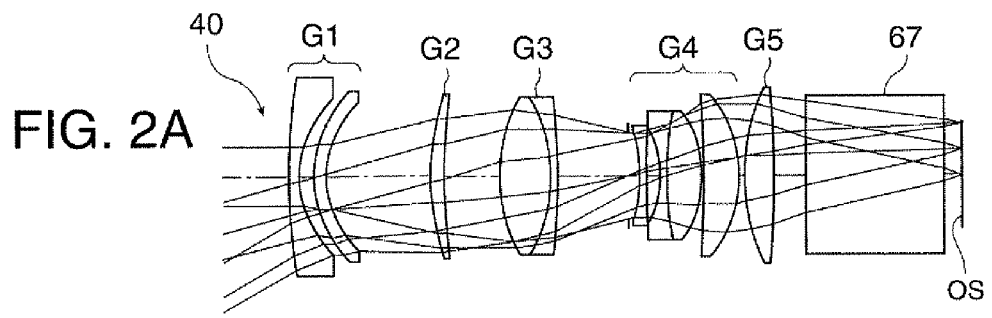
FIGS. 2A to 2C are views showing the state of light beams passing through the projection zoom lens shown in FIGS. 1A and 1B.
Figure 2:
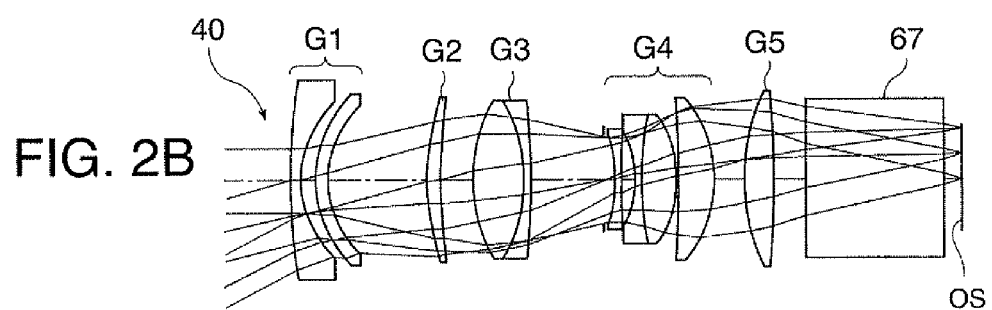
Figure 2:
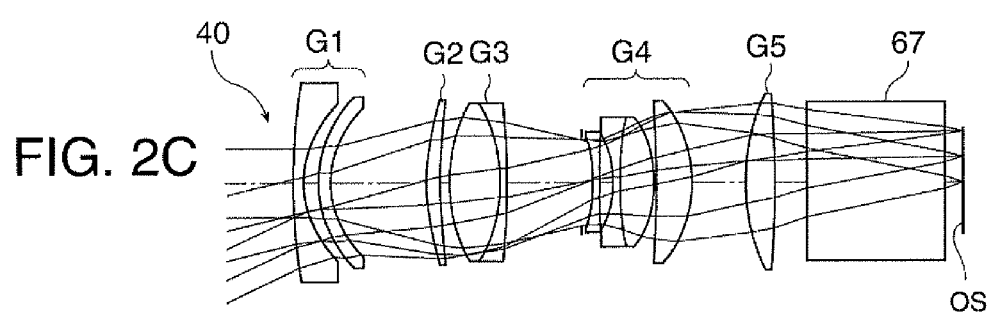

Hereinafter, a projection zoom lens according to a first embodiment of the invention will be described with reference to FIGS. 1A to 2C. In addition, FIG. 1A shows the state of a projection zoom lens 40 at the wide angle end, and FIG. 1B shows the state of the projection zoom lens 40 at the telescopic end.

The projection zoom lens 40 shown in FIGS. 1A and 1B is for projecting an image on an object surface OS onto a screen (not shown) in an enlarged manner. The projection zoom lens 40 includes a first lens group G1 with negative power, a second lens group G2 with positive power, the third lens group G3 with positive power, a fourth lens group G4 with positive power, and a fifth lens group G5 with positive power in order from the screen side which is the enlargement side (left side in FIGS. 1A and 1B) toward the object surface OS side which is the reduction side (right side in FIGS. 1A and 1B). A diaphragm 45 is provided between the third and fourth lens groups G3 and G4. Here, the term 'lens group' means being configured to include one or more lenses, including the case of being configured by one lens. Therefore, in the following description, although each of the second and fifth lens groups G2 and G5 includes a single lens, the term 'lens group' will be used for the sake of convenience.

The projection zoom lens 40 is formed such that the object surface OS side is almost telecentric. In addition, a cross dichroic prism 67 for combining images of three colors is disposed between the fifth lens group G5, which is located at the rear end of the projection zoom lens 40, and the object surface OS on which a liquid crystal display panel is disposed. In addition, although object surfaces on which liquid crystal display panels corresponding to the other two colors are to be disposed are not shown, the object surfaces are disposed similar to the object surface OS shown in the drawing. Referring to FIGS. 1A and 1B, a light beam which spreads to have a predetermined width with a principle beam, which is perpendicular to the object surface OS and is parallel to the optical axis OA, as the center is emitted from each object point on the object surface OS, moves to the left, and passes through the projection zoom lens 40 to be then projected onto the screen.

The first lens group G1 is formed by two lenses including a first negative meniscus lens L1, which is convex toward the enlargement side, and a second negative meniscus lens L2, which is convex toward the enlargement side and both surfaces of which are aspheric, in order from the enlargement side (emission side) to the reduction side (incidence side). The lenses L1 and L2 are fixed on the optical axis OA so as not to move at the time of magnification change. Here, the first negative meniscus lens L1 functions as an enlargement-side negative lens, and the second negative meniscus lens L2 functions as a reduction-side negative lens.

The second lens group G2 includes only a positive meniscus lens L3 which is convex toward the enlargement side (emission side), and moves along the optical axis OA at the time of magnification change.

The third lens group G3 includes only a biconvex positive doublet lens L4 and moves along the optical axis OA at the time of magnification change. The doublet lens L4 is formed by a biconvex positive lens L41, which is disposed at the enlargement side (emission side), and a negative meniscus lens L42, which is disposed at the reduction side (incidence side) and is convex toward the reduction side.

The fourth lens group G4 includes a biconcave negative lens L5, a doublet lens L6 which is concave toward the enlargement side and convex toward the reduction side, and a positive meniscus lens L7 which is convex toward the reduction side, in order from the enlargement side (emission side) to the reduction side (incidence side). The lenses L5, L6, and L7 move integrally along the optical axis OA at the time of magnification change. Among the lenses, the doublet lens L6 located in the middle is formed by a biconcave negative lens L61, which is disposed at the enlargement side, and a biconvex positive lens L62, which is disposed at the reduction side.

The fifth lens group G5 includes only a biconvex positive lens L5 and does not move on the optical axis OA at the time of magnification change.

When performing a zooming operation, that is, changing the magnification in the projection zoom lens 40, the second, third, and fourth lens groups G2, G3, and G4 are made to move on the optical axis OA under the conditions in which the first and fifth lens groups G1 and G5 are fixed. In the case of magnification change from the wide angle end side to the telescopic end side, the three moving lens groups G2, G3, and G4 move gradually toward the screen side along the optical axis OA while changing the distance therebetween. On the contrary, in the case of magnification change from the telescopic end side to the wide angle end side, the three moving lens groups G2, G3, and G4 move gradually toward the object surface OS side along the optical axis OA while changing the distance therebetween. In addition, focusing when the distance to the screen changes can be performed by moving the first lens group G1 in the direction of the optical axis OA.

Now, the configuration conditions of the projection zoom lens 40 in the present embodiment will be described.

As a zoom optical system with a simplest configuration when the relatively long back focus is needed, a so-called two-group zoom is widely known in which a negative first lens group is disposed at the enlargement side and a positive second lens group is disposed at the reduction side and the magnification change is performed by changing the distance between the two lens groups. Although the five-group zoom including the five lens groups G1 to G5 is adopted in the projection zoom lens 40 according to the first embodiment, it may be possible to consider the two-group zoom as a whole in which the first and second lens groups G1 and G2 form a first negative composite lens group disposed at the enlargement side and the third and fourth lens groups G3 and G4 form a second positive composite lens group disposed at the reduction side. For a projection zoom lens used in a projector, high resolving power, bright F number, sufficient amount of ambient light, and the like are demanded compared with an optical system, such as a photographic lens. Accordingly, in the simple two-group zoom described above, it becomes difficult to meet such demands. For this reason, in the projection zoom lens 40 according to the present embodiment, the distance between the first and second lens groups G1 and G2 and the distance between the third and fourth lens groups G3 and G4 are changed further to realize the high resolving power, the small F number, and an increase in the amount of ambient light.

Moreover, in a three plate type projector which performs color combining, the above-described cross dichroic prism 67 is disposed between a projection zoom lens and a liquid crystal panel in order to mix light beams of three colors of red, green, and blue which are emitted from the liquid crystal panel. In the cross dichroic prism 67, all light beams emitted vertically from the liquid crystal panel need to travel toward the entrance pupil of the projection zoom lens 40 in order to prevent the color unevenness. In order to suppress such color unevenness, the fifth lens group G5 acts as a lens group for obtaining good telecentricity.

As described above, in the present embodiment, the basic configuration of the two-group zoom including the negative composite lens group, which includes the first and second lens groups G1 and G2, and the positive composite lens group, which includes the third and fourth lens groups G3 and G4, is adopted. Moreover, it is also necessary to make the first lens group G1 function as a focus group when changing the projection distance. Accordingly, the frame configuration can be simplified by fixing the first lens group G1 when zooming, which is preferable in terms of miniaturization and prevention of degradation of the performance. For this reason, in the negative composite lens group including the first and second lens groups G1 and G2, the first lens group G1 is fixed and only the second lens group G2 moves when zooming so that the focus shift caused by the movement of the third and fourth lens groups G3 and G4 with main magnification change functions when zooming is corrected. In this case, it becomes possible to maintain high resolving power while realizing the bright F number by setting the second lens group G2 to have relatively weak positive power and setting it within the range of the following conditional expression (1).

$$0.05 < F/F2 < 0.23 \tag{1}$$

Here, 'F' is a focal length at the wide angle end of the whole system including the first to fifth lens groups G1 to G5, and F2 is a focal length of the second lens group G2. This conditional expression (1) is a condition regarding the power of the second lens group G2. Moreover, the conditional expression (1) is a condition for obtaining the sufficient brightness for a projection optical system and for performing well-balanced correction of coma aberration, astigmatism, chromatic aberration, and the like and is also a condition for suppressing fluctuations in these aberrations to be small when zooming from the wide angle end to the telescopic end. That is, the positive power of the second lens group G2 is suppressed so as not to exceed the upper limit of the conditional expression (1). Accordingly, since it becomes easy to configure the second lens group G2 with one positive lens, well-balanced correction of the coma aberration, astigmatism, and the like can be performed. Moreover, the positive power of the second lens group G2 is strong so as not to be less than the lower limit of the conditional expression (1). Accordingly, since the amount of movement of the second lens group G2 can be reduced at the time of magnification change, it is possible to reduce a fluctuation in chromatic aberration when zooming.

The first and second lens groups G1 and G2 act as the negative composite lens group of the two-group zoom as described above, but the first lens group G1 includes only a plurality of negative lenses. Accordingly, within the first lens group G1, it is difficult to suppress the occurrence of a chromatic aberration of magnification in the screen periphery which is peculiar to the wide angle system. For this reason, it is necessary to suppress the occurrence of a chromatic aberration within a composite group including the first and second lens groups G1 and G2. In addition, the first lens group G1 has strong negative power in order to obtain the wide angle of view and the long back focus. However, due to the positive power of the second lens group G2, it is necessary to suppress the occurrence of distortion or coma aberration which occurs within the first and second lens groups G1 and G2.

For the first and second lens groups G1 and G2, assuming that the focal length of the first lens group G1 is F1, the following conditional expression (2) is satisfied.

$$0.12 < |F1/F2| < 0.30 \tag{2}$$

This conditional expression (2) is a condition regarding the ratio of the focal length of the first lens group G1 and the focal length of the second lens group G2. By distributing the power of the first lens group G1 and the power of the second lens group G2 appropriately within the range of the conditional expression (2), it is possible to obtain an image surface which is flat and has a wide angle of view while maintaining the sufficient negative power for obtaining the sufficient back focus. As a result, it becomes possible to suppress the chromatic aberration of magnification, which easily occurs in the wide angle system, to be small and to satisfactorily correct the distortion and the coma aberration in a region with a wide angle of view. That is, the positive power of the second lens group G2 is suppressed so as not to exceed the upper limit of the conditional expression (2) for the first lens group G1. Accordingly, although the second lens group G2 includes only one positive lens, well-balanced correction of the coma aberration or distortion can be performed. In addition, the positive power of the second lens group G2 is strong so as not to be less than the lower limit of the conditional expression (2). Accordingly, the chromatic aberration of magnification occurring in the first lens group can be corrected by the second lens group G2.

The third lens group G3 preferably has strong positive power in order to guide diverging light passing through the fifth lens group G5 and the fourth lens group G4 to the second lens group G2. Therefore, the third lens group G3 is formed as a doublet lens of the positive lens L41, which is convex toward the enlargement side, and the negative meniscus lens L42, which is disposed at the reduction side and is convex toward the reduction side. Thus, by using the doublet lens with an achromatic effect, an error at the time of manufacture is prevented.

For the third lens group G3, assuming that the focal length of the third lens group G3 is F3, the following conditional expression (3) is satisfied.

$$0.2 < F3/F2 < 0.5 \tag{3}$$

This conditional expression (3) is a condition regarding the ratio of the focal length of the second lens group G2 and the focal length of the third lens group G3. By setting the power of each of the second and third lens groups G2 and within the range of the conditional expression (3), well-balanced correction of the coma aberration or astigmatism can be performed. That is, since the positive power of the third lens group G3 is strong so as not to exceed the upper limit of the conditional expression (3), well-balanced correction of the astigmatism becomes possible. In addition, the positive power of the third lens group G3 is suppressed so as not to be less than the lower limit of the conditional expression (3). Accordingly, since a curvature of field or an astigmatism can be suppressed to be small without worsening the chromatic aberration satisfactorily corrected in the first and second lens groups G1 and G2, it is possible to prevent the color flare or the like from becoming worse in the screen periphery. In addition, by suppressing the positive power of the third lens group G3, the third lens group G3 can be formed reasonably by a doublet lens using two positive and negative lenses. This is advantageous in terms of a decrease in sensitivity or cost reduction.

The fourth lens group G4 is formed by four lenses including the negative lens L5 which is concave toward the enlargement side, the negative lens L61 which is concave toward the enlargement side, the positive lens L62 which is convex toward the reduction side, and the positive meniscus lens L7 which is convex toward the reduction side in order from the enlargement side. In this case, it is preferable that at least a concave surface 16a at the furthest enlargement side is an aspheric surface. The negative lens L5 at the furthest enlargement side can be processed at low cost since the effective diameter is small. Accordingly, by making the concave surface 16a at the furthest enlargement side as an aspheric surface, a spherical aberration or a coma aberration can be effectively corrected.

The third and fourth lens groups G3 and G4 move a lot from the reduction side to the enlargement side while slightly changing the distance therebetween when zooming from the wide angle end to the telescopic end, and mainly play a role of magnification change.

For the third and fourth lens groups G3 and G4, assuming that the composite focal length of the third and fourth lens groups G3 and G4 at the wide angle end is F34, the following conditional expression (4) is satisfied.

$$0.2<F/F34<0.4 \quad (4)$$

This conditional expression (4) is a condition regarding the composite power of the third and fourth lens groups G3 and G4. By setting it within the range of the conditional expression (4), the projection zoom lens 40 can be made as a bright and small projection optical system. That is, the composite positive power of the third and fourth lens groups G3 and G4 is suppressed so as not to exceed the upper limit of the conditional expression (4) for the whole system. Accordingly, since the worsening of a spherical aberration or off-axis coma aberration can be suppressed, it is possible to prevent coma flare from increasing in the whole screen region. In addition, since the bright F number is obtained, a sufficient amount of ambient light can be ensured. In addition, if the upper limit of the conditional expression (4) is exceeded, it becomes difficult to make the spherical aberration or the off-axis coma aberration small. Accordingly, it becomes necessary to use glass with a high refractive index, for example. However, this is not preferable in terms of cost reduction. Since the composite positive power of the third and fourth lens groups G3 and G4 is strong so as not to be less than the lower limit of the conditional expression (4), the composite negative power of the first and second lens groups G1 and G2 can be made strong to some extent. Accordingly, the amount of movement of the third and fourth lens groups G3 and G4 when zooming is suppressed, and this is advantageous in terms of miniaturization. Moreover, the diaphragm 45 is provided between the third and fourth lens groups G3 and G4. Accordingly, since the amount of movement of the diaphragm 45 at the telescopic end with respect to the wide angle end is decreased by reducing the amount of movement of the third and fourth lens groups G3 and G4, a fluctuation in the F number at the telescopic end is suppressed and the projection zoom lens 40 can be made bright.

The first lens group G1 has strong negative power in order to obtain the wide angle of view, but it is difficult to suppress the distortion to be small in a combination of only a negative lens with a spherical shape. Accordingly, in the present embodiment, the second negative meniscus lens L2 is formed as an aspheric lens, which is a molded lens formed of a resin material. Compared with a glass lens, the lens formed of a resin material is disadvantageous in terms of a problem of durability, which is related to damage and the like, or degradation of the performance under the influence of environmental changes, such as the temperature or the humidity. Therefore, the second negative meniscus lens L2 formed of a resin material is not in contact with the outside, so that the influence of environmental changes caused by contact with the air can be suppressed. Moreover, in order to minimize the influence of environmental changes, the second negative meniscus lens L2 is made to have weak power and the incidence angle of a light beam on each surface is reduced by using the meniscus shape which is convex toward the enlargement side. Thus, the influence of environmental changes, such as the temperature and the humidity, can be reduced.

For the first lens group G1, assuming that the focal length of the first negative meniscus lens L1 is Fs and the focal length of the second negative meniscus lens L2 is Fa, the following conditional expression (5) is satisfied.

$$0.2<Fs/Fa<0.5 \quad (5)$$

This conditional expression (5) is a condition when the second negative meniscus lens L2 in the first lens group G1 is formed as an aspheric resin lens. By restricting the power of the second negative meniscus lens L2 and the power of the other lenses within the range of the conditional expression (5), the influence of environmental changes can be prevented while maintaining the good performance. That is, since the negative power of the second negative meniscus lens L2 is suppressed so as not to exceed the upper limit of the conditional expression (5), the influence of environmental changes, such as the temperature and the humidity, is suppressed. Especially for the temperature, in the case where the lens is assembled into a projector, a possibility is high that a local temperature change will occur due to an increase in the inside temperature of the device while being used immediately after lighting of a lamp. However, a phenomenon that the focusing position moves or the curvature of field changes can be suppressed by the power restriction described above. In addition, the negative power of the second negative meniscus lens L2 is strong so as not to be less than the lower limit of the conditional expression (5), such that it is prevented that a load of the negative power of the first negative meniscus lens L1 becomes too large. As a result, it is possible to prevent that the negative distortion especially at the wide angle end changes abruptly in the periphery and accordingly, the degree of distortion in the outer frame portion of the screen increases, without increasing the negative lens in the first lens group.

2. Specific Example of a Projection Zoom Lens (2a) First Specific Example

Lens data and the like of a first specific example of the projection zoom lens 40 are shown in Table 1. In the upper column of Table 1, 'surface number' is a number given to a surface of each lens sequentially from the object surface OS side. In addition, 'R' indicates the radius of curvature, and 'D' indicates the lens thickness or air spacing up to the next surface. In addition, 'Nd' indicates the refractive index at the d line of a lens material, and 'vd' indicates the Abbe number at the d line of a lens material. Moreover, in the column of 'D', distances D4, D6, D9, and D17 indicate variable distances.

The values of the distances D4, D6, D9, and D17 at 'wide angle end', 'middle', and 'telescopic end' are shown in the middle column of Table 1.

TABLE 1

| surface number | | R | D | Nd | vd |
|---|---|---|---|---|---|
| 0 | | ∞ | 1800.000 | | |
| 1 | | 125.905 | 1.800 | 1.69680 | 55.46 |
| 2 | | 20.354 | 2.800 | | |
| 3 | * | 21.500 | 2.200 | 1.53116 | 56.05 |
| 4 | * | 15.924 | D4 | | |
| 5 | | 48.698 | 2.400 | 1.80518 | 25.46 |
| 6 | | 99.185 | D6 | | |
| 7 | | 29.785 | 9.500 | 1.74400 | 44.90 |
| 8 | | −28.405 | 1.300 | 1.80610 | 33.27 |
| 9 | | −160.096 | D9 | | |
| aperture | | ∞ | 2.000 | | |
| 11 | * | −41.932 | 1.400 | 1.83400 | 37.34 |
| 12 | | 279.293 | 2.471 | | |
| 13 | | −18.688 | 1.300 | 1.80518 | 25.46 |
| 14 | | 62.475 | 6.300 | 1.48749 | 70.44 |
| 15 | | −21.319 | 0.200 | | |
| 16 | | −491.272 | 6.876 | 1.69680 | 55.46 |
| 17 | | −23.102 | D17 | | |
| 18 | | 37.982 | 5.400 | 1.58913 | 61.25 |
| 19 | | −153.553 | 6.000 | | |
| 20 | | ∞ | 25.750 | 1.51680 | 64.20 |
| 21 | | ∞ | 3.350 | | |

| | wide angle end | middle | telescopic end |
|---|---|---|---|
| D4 | 19.453 | 18.723 | 18.707 |
| D6 | 10.479 | 6.212 | 1.500 |
| D9 | 13.425 | 13.906 | 14.171 |
| D17 | 1.000 | 5.516 | 9.979 |

| ASP | k | A04 | A06 |
|---|---|---|---|
| R3 | 0.00000E+00 | 2.06533E−06 | −4.51412E−08 |
| R4 | −5.14320E−01 | −1.10028E−05 | −8.14152E−08 |
| R11 | 7.24569E−01 | −3.98807E−05 | −9.86541E−08 |

| ASP | A08 | A10 | A12 |
|---|---|---|---|
| R3 | 0.00000E+00 | 0.00000E+00 | 0.00000E+00 |
| R4 | −1.18979E−12 | −7.39028E−15 | 0.00000E+00 |
| R11 | 2.34401E−10 | 0.00000E+00 | 0.00000E+00 |

In the first specific example, the lenses L1 to L8 are basically formed to have spherical surfaces, but incidence and emission surfaces (third and fourth surfaces of Table 1) of the second negative meniscus lens L2 and an incidence surface (eleventh surface of Table 1) of the negative lens L5 are aspheric surfaces as described above. The amount x of displacement of such aspheric shape from the surface apex in the direction of the optical axis OA is expressed as the following Expression 1 assuming that 'c' is the reciprocal of the paraxial radius of curvature, 'h' is the height from the optical axis OA, 'k' is a constant of the cone, and 'A04' to 'A12' are high-order aspheric coefficients.

$$x = \frac{c \cdot h^2}{1 + \sqrt{1 - (1+k) \cdot c^2 \cdot h^2}} + A04 \cdot h^4 + A06 \cdot h^6 + A08 \cdot h^8 + A10 \cdot h^{10} + A12 \cdot h^{12}$$ [Expression 1]

In the first specific example, the values of the coefficients 'k' and 'A04' to 'A12' in the above aspheric expression are shown in the lower column of Table 1.

Regarding the consequent specifications of the projection zoom lens 40 in the first specific example, the focal length f in the whole system was f=16.90, 18.59, 20.28 and the F number was FNo=1.49, 1.58, 1.63 in order of the wide angle end, the middle, and the telescopic end. In this case, the half angle of view ω was ω=30.02°, 27.68°, and 25.70°.

Moreover, in the case of the projection zoom lens 40 in the first specific example, F/F2 in the conditional expression (1) was 0.146, |F1/F2| in the conditional expression (2) was 0.228, F3/F2 in the conditional expression (3) was 0.316, F/F34 in the conditional expression (4) was 0.302, and Fs/Fa in the conditional expression (5) was 0.262.

FIGS. 3A to 3C are views showing all kinds of aberrations at the wide angle end in the first specific example. The left end of the views showing all kinds of aberrations illustrates a spherical aberration of each color at the reference wavelength of 550 nm and other wavelengths of 610 nm and 460 nm, the middle of the views showing all kinds of aberrations illustrates an astigmatism at the wavelength of 550 nm, and the right end of the views showing all kinds of aberrations illustrates a distortion at the wavelength of 550 nm.

FIGS. 3D to 3F are views showing all kinds of aberrations at the intermediate focal length in the first specific example and correspond to FIGS. 3A to 3C, respectively. The left end shows a spherical aberration of each color, the middle shows an astigmatism, and the right end shows a distortion.

FIGS. 3G to 3I are views showing all kinds of aberrations at the telescopic end in the first specific example and correspond to FIGS. 3A to 3C, respectively. The left end shows a spherical aberration of each color, the middle shows an astigmatism, and the right end shows a distortion.

(2b) Second Specific Example

Figure 4:
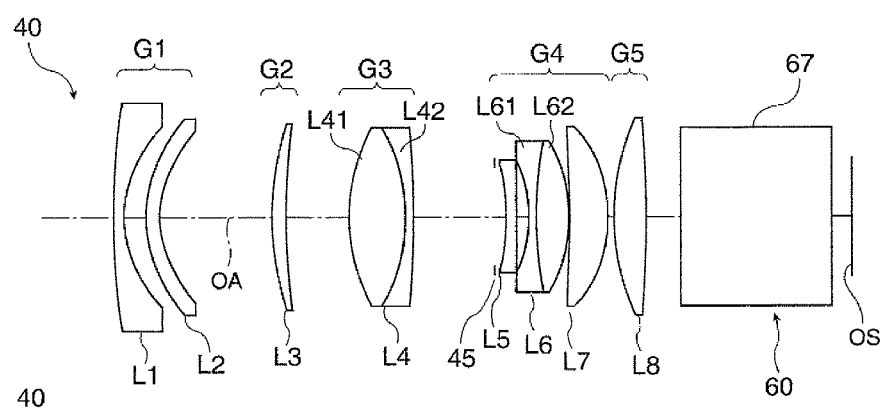
FIGS. 4A and 4B are views explaining the configuration of a projection zoom lens in a second specific example of the first embodiment.
Figure 4:
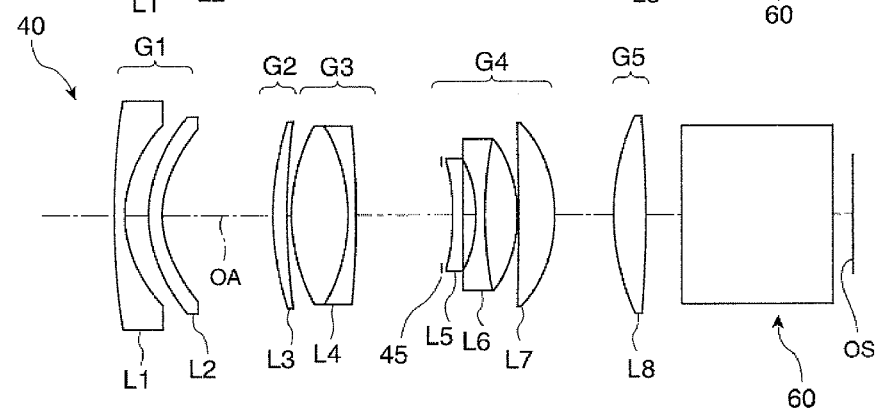

FIGS. 4A and 4B are views showing the specific configuration of the projection zoom lens 40 in a second specific example. Basically, the projection zoom lens 40 in the second specific example has the same structure as the projection zoom lens 40 in the first specific example as the first embodiment, and a detailed explanation thereof will be omitted.

Lens data and the like of the second specific example of the projection zoom lens 40 are shown in Table 2. Specifications, such as 'surface number', 'R', 'D', 'Nd', and 'vd', are shown in the upper column of Table 2. Moreover, the values of the distances D4, D6, D9, and D17 at 'wide angle end', 'middle', and 'telescopic end' in the second specific example are shown in the middle column of Table 2. Also in the second specific example, the third, fourth, and eleventh surfaces are aspheric surfaces and have the aspheric shapes corresponding to the coefficients 'k' and 'A04' to 'A12' shown in the lower column of Table 2, similar to the case of the first specific example shown in Table 1.

TABLE 2

| surface number | | R | D | Nd | vd |
|---|---|---|---|---|---|
| 0 | | ∞ | 1800.000 | | |
| 1 | | 108.725 | 1.800 | 1.62299 | 58.12 |
| 2 | | 18.953 | 4.237 | | |
| 3 | * | 21.741 | 2.200 | 1.53116 | 56.05 |
| 4 | * | 15.454 | D4 | | |
| 5 | | 52.713 | 2.400 | 1.80518 | 25.46 |
| 6 | | 99.018 | D6 | | |
| 7 | | 29.178 | 9.500 | 1.74400 | 44.90 |
| 8 | | −29.432 | 1.300 | 1.80610 | 33.27 |
| 9 | | −174.164 | D9 | | |
| aperture | | ∞ | 2.000 | | |
| 11 | * | −36.570 | 1.600 | 1.82896 | 37.11 |
| 12 | | −587.543 | 2.187 | | |
| 13 | | −19.448 | 1.300 | 1.80518 | 25.46 |
| 14 | | 74.471 | 5.500 | 1.48749 | 70.44 |

TABLE 2-continued

| | | | | |
|---|---|---|---|---|
| 15 | −22.372 | 0.200 | | |
| 16 | −244.050 | 6.400 | 1.69680 | 55.46 |
| 17 | −22.199 | D17 | | |
| 18 | 38.326 | 5.400 | 1.58913 | 61.25 |
| 19 | −148.491 | 6.000 | | |
| 20 | ∞ | 25.750 | 1.51680 | 64.20 |
| 21 | ∞ | 3.351 | | |

| | wide angle end | middle | telescopic end |
|---|---|---|---|
| D4 | 18.770 | 18.622 | 19.172 |
| D6 | 10.636 | 5.949 | 0.800 |
| D9 | 13.863 | 1.344 | 14.579 |
| D17 | 1.000 | 5.353 | 9.718 |

| ASP | k | A04 | A06 |
|---|---|---|---|
| R3 | 0.00000E+00 | −1.46189E−05 | 0.00000E+00 |
| R4 | −5.76356E−01 | −2.86717E−05 | −4.43312E−08 |
| R11 | −1.22870E+00 | −4.35573E−05 | −9.85657E−08 |

| ASP | A08 | A10 | A12 |
|---|---|---|---|
| R3 | 0.00000E+00 | 0.00000E+00 | 0.00000E+00 |
| R4 | 1.05787E−10 | −3.59487E−13 | 0.00000E+00 |
| R11 | 8.46040E−11 | 0.00000E+00 | 0.00000E+00 |

Regarding the consequent specifications of the projection zoom lens 40 in the second specific example, the focal length f in the whole system was f=16.90, 18.59, 20.28 and the F number was FNo=1.58, 1.63, 1.70 in order of the wide angle end, the middle, and the telescopic end. In this case, the half angle of view ω was ω=30.02°, 27.70°, and 25.72°.

Moreover, in the case of the projection zoom lens 40 in the second specific example, F/F2 in the conditional expression (1) was 0.125, |F1/F2| in the conditional expression (2) was 0.194, F3/F2 in the conditional expression (3) was 0.266, F/F34 in the conditional expression (4) was 0.315, and Fs/Fa in the conditional expression (5) was 0.324.

FIGS. 5A to 5C are views showing all kinds of aberrations at the wide angle end in the second specific example. The left end of the views showing all kinds of aberrations illustrates a spherical aberration of each color at the reference wavelength of 550 nm and other wavelengths of 610 nm and 460 nm, the middle of the views showing all kinds of aberrations illustrates an astigmatism at the wavelength of 550 nm, and the right end of the views showing all kinds of aberrations illustrates a distortion at the wavelength of 550 nm.

FIGS. 5D to 5F are views showing all kinds of aberrations at the intermediate focal length in the second specific example and correspond to FIGS. 5A to 5C, respectively. The left end shows a spherical aberration of each color, the middle shows an astigmatism, and the right end shows a distortion.

FIGS. 5G to 5I are views showing all kinds of aberrations at the telescopic end in the second specific example and correspond to FIGS. 5A to 5C, respectively. The left end shows a spherical aberration of each color, the middle shows an astigmatism, and the right end shows a distortion.

3. Explanation on a Projection Type Image Display Device

Figure 6:
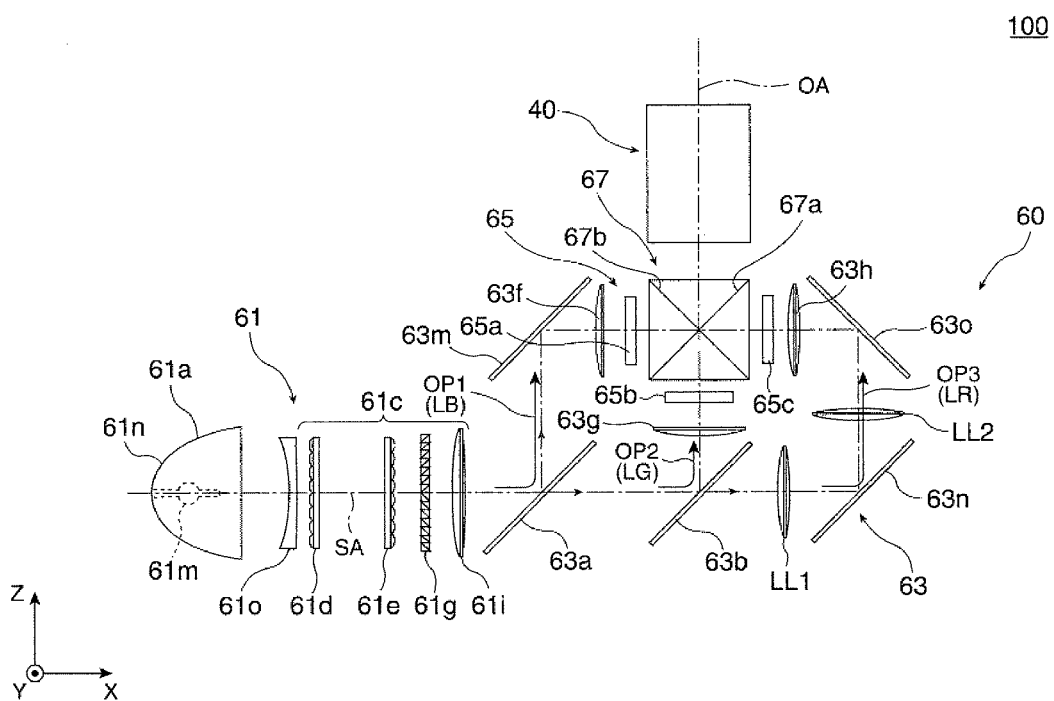
FIG. 6 is a conceptual view explaining the configuration of a projection type image display device according to the first embodiment.

FIG. 6 is a conceptual view showing a projection type image display device 100. An image forming optical unit 60 of the projection type image display device includes along the system optical axis SA: a light source device 61 which emits uniform light source light; a separation illumination system 63 which separates illumination light emitted from the light source device 61 into three colors of red, green, and blue; a light modulator 65 illuminated by the illumination light of each color emitted from the separation illumination system 63; and a cross dichroic prism 67 which mixes the modulated light of each color passing through the light modulator 65.

Here, the light source device 61 includes a light source unit 61a that emits light source light and a uniformization optical system 61c that converts the light source light, which is emitted from the light source unit 61a, into illumination light aligned uniformly in a predetermined polarization direction. The light source unit 61a has a light source lamp 61m and a reflector 61n. In addition, the uniformization optical system 61c includes: a first lens array 61d which divides the light source light into partial light beams; a second lens array 61e which adjusts the spread of the divided partial light beams; a polarization converter 61g which aligns the polarization directions of the partial light beams; and a superposition lens 61i which makes the partial light beams incident on the region to be illuminated under the conditions in which the partial light beams are superimposed.

The separation illumination system 63 includes first and second dichroic mirrors 63a and 63b and optical path curving mirrors 63m, 63n, and 63o, and separates the illumination light into three light beams of blue light LB, green light LG, and red light LR by branching the system optical path SA into three optical paths OP1 to OP3. In addition, relay lenses LL1 and LL2 prevent the light use efficiency from lowering due to diffusion of light or the like by transmitting an image, which is formed immediately before the first relay lens LL1 on the incidence side, to a field lens 63h on the emission side while maintaining almost the same state.

The light modulator 65 includes three liquid crystal light valves 65a, 65b, and 65c on which the illumination light beams LB, LG, and LR of three colors are incident, respectively, and performs intensity modulation of each of the color light beams LB, LG, and LR, which are incident on the liquid crystal light valves 65a, 65b, and 65c through field lenses 63E, 63g, and 63h, in the pixel unit according to a driving signal. In addition, each of the liquid crystal light valves 65a, 65b, and 65c is an image forming device having a structure in which a liquid crystal panel is interposed between a pair of polarizers. In addition, the liquid crystal panel which forms each of the liquid crystal light valves 65a, 65b, and 65c corresponds to the object surface OS shown in FIGS. 1A and 1B and the like.

The cross dichroic prism 67 includes dichroic films 67a and 67b crossing each other and emits image light obtained by combining the modulated light beams from the liquid crystal light valves 65a, 65b, and 65c.

The projection zoom lens 40 has a configuration shown in FIGS. 1A, 1B, 4A, and 4B and projects the image light, which is obtained by the combining in the cross dichroic prism 67, as a color image onto the screen with suitable magnification and relatively small aberration.

In the projection type image display device 100 described above, the projection zoom lens 40 which basically has a function as the so-called two-group zoom is provided and high resolving power, a small F number, and an increase in the amount of ambient light are realized by shifting the second, third, and fourth lens groups G2, G3, and G4. Moreover, in the projection zoom lens 40, the fifth lens group G5 acts as a lens group for obtaining good telecentricity. Accordingly, the occurrence of color unevenness in the cross dichroic prism 67, which is a color combining prism, can be suppressed. The projection zoom lens 40 according to the present embodiment satisfies the conditions that it has a relatively wide angle of view, it is a bright optical system with a small F number, and the price is low since the lens configuration is simple.

Second Embodiment

FIGS. 7A and 7B show the lens configuration of a projection zoom lens according to a second embodiment. FIG. 7A shows the state of the projection zoom lens 40 at the wide angle end, and FIG. 7B shows the state of the projection zoom lens 40 at the telescopic end. The projection zoom lens 40 according to the present embodiment is obtained by changing the projection zoom lens 40 according to the first embodiment shown in FIGS. 1A and 1B, and has the same structure as the projection zoom lens 40 according to the first embodiment in a portion which is not described in particular.

1. Explanation on a Projection Optical System

As shown in FIG. 7A and the like, the projection zoom lens 40 includes a first lens group G1 with negative power, a second lens group G2 with positive power, a third lens group G3 with positive power, a fourth lens group G204 with positive power, and a fifth lens group G5 with positive power in order from the enlargement side toward the reduction side. Here, the first lens group G1, the second lens group G2, the third lens group G3, and the fifth lens group G5 are the same as those in the projection zoom lens 40 according to the first embodiment, and only the lens configuration of the fourth lens group G204 is different from that of the fourth lens group G4 in the first embodiment. That is, the fourth lens group G204 includes a doublet lens L206, which is concave toward the enlargement side and convex toward the reduction side, and a positive meniscus lens L7, which is convex toward the reduction side, in order from the enlargement side (emission side) to the reduction side (incidence side). The lenses L206 and L7 move integrally along the optical axis OA at the time of magnification change. The doublet lens L206 of the lenses is formed by a biconcave negative lens L261, which is disposed at the enlargement side, and a biconvex positive lens L262, which is disposed at the reduction side. In addition, a reduction-side convex surface 216a of the positive lens L262 is an aspheric surface. In this case, at least one surface of the doublet lens L206 is an aspheric surface. As a result, it becomes possible to correct a spherical aberration, a coma aberration, and the like effectively.

2. Specific Example of a Projection Zoom Lens

Lens data and the like of a third specific example (ordinal number is given to the specific example with the serial number from the first embodiment) of the projection zoom lens 40 are shown in Table 3. Specifications, such as 'surface number', 'R', 'D', 'Nd', and 'vd', are shown in the upper column of Table 3. Moreover, the values of the distances D4, D6, D9, and D15 at 'wide angle end', 'middle', and 'telescopic end' in the third specific example are shown in the middle column of Table 3. In the third specific example, the third, fourth, and thirteenth surfaces are aspheric surfaces and have the aspheric shapes corresponding to the coefficients 'k' and 'A04' to 'A12' shown in the lower column of Table 3.

TABLE 3

| surface number | | R | D | Nd | vd |
|---|---|---|---|---|---|
| 0 | | ∞ | 1800.000 | | |
| 1 | | 151.586 | 1.800 | 1.51680 | 64.20 |
| 2 | | 17.400 | 5.278 | | |
| 3 | * | 26.345 | 2.200 | 1.53116 | 56.05 |

TABLE 3-continued

| 4 | * | 16.939 | D4 | | |
|---|---|---|---|---|---|
| 5 | | 52.664 | 2.400 | 1.75520 | 27.53 |
| 6 | | 153.527 | D6 | | |
| 7 | | 33.169 | 6.500 | 1.70200 | 40.19 |
| 8 | | −32.550 | 1.300 | 1.75520 | 27.53 |
| 9 | | −155.040 | D9 | | |
| aperture | | ∞ | 6.608 | | |
| 11 | | −15.166 | 1.300 | 1.84666 | 23.78 |
| 12 | | 199.015 | 4.719 | 1.48749 | 70.44 |
| 13 | * | −37.358 | 0.200 | | |
| 14 | | −162.377 | 6.200 | 1.69680 | 55.46 |
| 15 | | −19.171 | D15 | | |
| 16 | | 41.108 | 5.000 | 1.74400 | 44.90 |
| 17 | | −196.304 | 6.000 | | |
| 18 | | ∞ | 25.750 | 1.51680 | 64.20 |
| 19 | | ∞ | 3.350 | | |

| | wide angle end | middle | telescopic end |
|---|---|---|---|
| D4 | 10.843 | 11.553 | 12.554 |
| D6 | 18.214 | 12.494 | 6.747 |
| D9 | 16.710 | 17.594 | 18.114 |
| D15 | 1.000 | 5.125 | 9.352 |

| ASP | k | A04 | A06 |
|---|---|---|---|
| R3 | 0.00000E+00 | −1.54222E−05 | 3.62245E−08 |
| R4 | −5.91539E−01 | −3.38923E−05 | 1.13526E−08 |
| R13 | 0.00000E+00 | 2.29954E−05 | 3.58775E−08 |

| ASP | A08 | A10 | A12 |
|---|---|---|---|
| R3 | 0.00000E+00 | 0.00000E+00 | 0.00000E+00 |
| R4 | −1.28525E−10 | 6.96203E−13 | −3.08271E−15 |
| R13 | −1.22420E−10 | 0.00000E+00 | 0.00000E+00 |

Regarding the consequent specifications of the projection zoom lens 40 in the third specific example, the focal length f in the whole system was f=16.90, 18.59, 20.28 and the F number was FNo=1.58, 1.64, 1.70 in order of the wide angle end, the middle, and the telescopic end. In this case, the half angle of view ω was ω=29.92°, 27.61°, and 25.63°.

A Moreover, in the case of the projection zoom lens 40 in the third specific example, F/F2 in the conditional expression (1) was 0.162, |F1/F2| in the conditional expression (2) was 0.245, F3/F2 in the conditional expression (3) was 0.397, F/F34 in the conditional expression (4) was 0.304, and Fs/Fa in the conditional expression (5) was 0.393.

FIGS. 8A to 8C are views showing all kinds of aberrations at the wide angle end in the third specific example. The left end of the views showing all kinds of aberrations illustrates a spherical aberration of each color at the reference wavelength of 550 nm and other wavelengths of 610 nm and 460 nm, the middle of the views showing all kinds of aberrations illustrates an astigmatism at the wavelength of 550 nm, and the right end of the views showing all kinds of aberrations illustrates a distortion at the wavelength of 550 nm.

FIGS. 8D to 8F are views showing all kinds of aberrations at the intermediate focal length in the third specific example and correspond to FIGS. 8A to 8C, respectively. The left end shows a spherical aberration of each color, the middle shows an astigmatism, and the right end shows a distortion.

FIGS. 8G to 8I are views showing all kinds of aberrations at the telescopic end in the third specific example and correspond to FIGS. 8A to 8C, respectively. The left end shows a spherical aberration of each color, the middle shows an astigmatism, and the right end shows a distortion.

Third Embodiment

Figure 9:
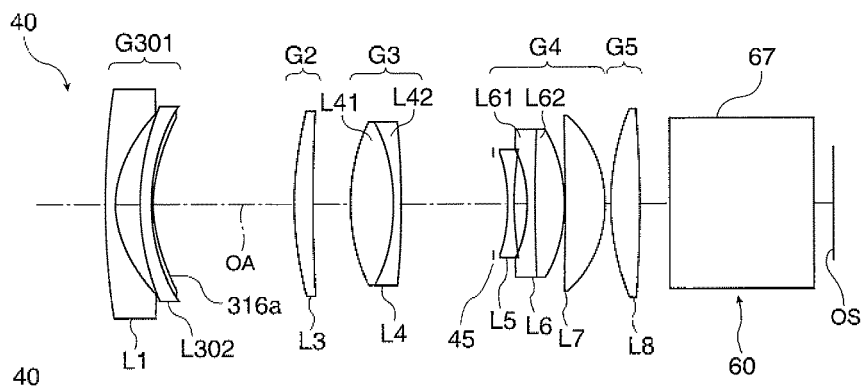
FIGS. 9A and 9B are views explaining the configuration of a projection zoom lens according to a third embodiment through a fourth specific example.
Figure 9:
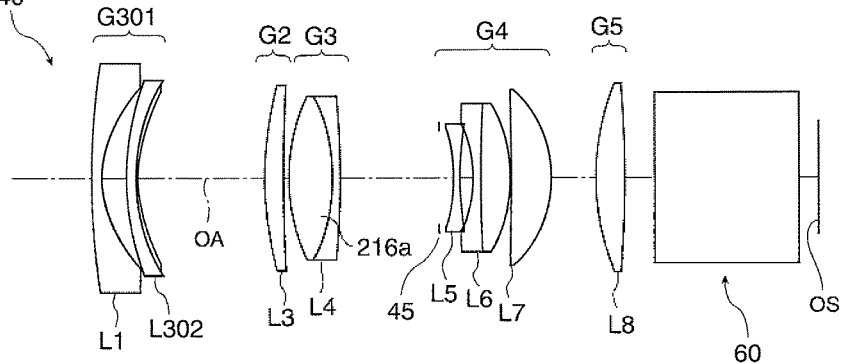

FIGS. 9A and 9B show the lens configuration of a projection zoom lens according to a third embodiment. FIG. 9A shows the state of the projection zoom lens 40 at the wide angle end, and FIG. 9B shows the state of the projection zoom lens 40 at the telescopic end. The projection zoom lens 40 according to the present embodiment is obtained by changing the projection zoom lens 40 according to the first embodiment shown in FIGS. 1A and 1B, and has the same structure as the projection zoom lens 40 according to the first embodiment in a portion which is not described in particular.

1. Explanation on a Projection Optical System

As shown in FIG. 9A and the like, the projection zoom lens 40 includes a first lens group G301 with negative power, a second lens group G2 with positive power, a third lens group G3 with positive power, a fourth lens group G4 with positive power, and a fifth lens group G5 with positive power in order from the enlargement side toward the reduction side. Here, the second lens group G2, the third lens group G3, the fourth lens group G4, and the fifth lens group G5 are the same as those in the projection zoom lens 40 according to the first embodiment, and only the lens configuration of the first lens group G301 is different from that of the first lens group G1 in the first embodiment. That is, the first lens group G301 is formed by two lenses including a first negative meniscus lens L1, which is convex toward the enlargement side, and a second negative meniscus lens L302, which is convex toward the enlargement side, in order from the enlargement side (emission side) to the reduction side (incidence side). The lenses L1 and L302 are fixed on the optical axis OA so as not to move at the time of magnification change. Here, the first negative meniscus lens L1 functions as an enlargement-side negative lens, and the second negative meniscus lens L302 functions as a reduction-side negative lens. The second negative meniscus lens L302 of the lenses is a composite aspheric lens in which a thin resin layer is formed on a reduction-side concave surface 316a. Thus, by disposing the thin resin layer with the aspheric surface at the concave surface 316a side of the second negative meniscus lens L302, a distortion can be effectively corrected.

2. Specific Example of a Projection Zoom Lens (2a) Fourth Specific Example

Lens data and the like of a fourth specific example of the projection zoom lens 40 are shown in Table 4. Specifications, such as 'surface number', 'R', 'D', 'Nd', and 'vd', are shown in the upper column of Table 4. Moreover, the values of the distances D5, D7, D10, and D18 at 'wide angle end', 'middle', and 'telescopic end' in the fourth specific example are shown in the middle column of Table 4. In the fourth specific example, the fifth and twelfth surfaces are aspheric surfaces and have the aspheric shapes corresponding to the coefficients 'k' and 'A04' to 'A12' shown in the lower column of Table 4.

TABLE 4

| surface number | R | D | Nd | vd |
|---|---|---|---|---|
| 0 | ∞ | 1800.000 | | |
| 1 | 111.387 | 1.800 | 1.58913 | 61.25 |
| 2 | 20.211 | 4.268 | | |

TABLE 4-continued

| | | | | |
|---|---|---|---|---|
| 3 | | 44.000 | 2.000 | 1.58913 | 61.25 |
| 4 | | 31.194 | 0.100 | 1.51468 | 53.40 |
| 5 | * | 24.512 | D5 | | |
| 6 | | 57.732 | 3.200 | 1.72825 | 28.32 |
| 7 | | 243.611 | D7 | | |
| 8 | | 32.855 | 7.500 | 1.65844 | 50.85 |
| 9 | | −30.540 | 1.100 | 1.64769 | 33.84 |
| 10 | | −186.343 | D10 | | |
| aperture | | ∞ | 2.704 | | |
| 12 | * | −33.591 | 1.200 | 1.59617 | 39.14 |
| 13 | | 73.043 | 2.057 | | |
| 14 | | −21.429 | 1.200 | 1.84666 | 23.78 |
| 15 | | 175.075 | 5.400 | 1.48749 | 70.44 |
| 16 | | −23.850 | 0.200 | | |
| 17 | | −187.952 | 6.800 | 1.58913 | 61.25 |
| 18 | | −18.584 | D18 | | |
| 19 | | 38.074 | 5.000 | 1.69680 | 55.46 |
| 20 | | −215.428 | 5.000 | | |
| 21 | | ∞ | 25.750 | 1.51680 | 64.20 |
| 22 | | ∞ | 3.350 | | |

| | wide angle end | middle | telescopic end |
|---|---|---|---|
| D5 | 24.692 | 23.221 | 22.292 |
| D7 | 6.290 | 3.699 | 1.000 |
| D10 | 15.855 | 16.503 | 16.981 |
| D18 | 1.000 | 4.415 | 7.557 |

| ASP | k | A04 | A06 |
|---|---|---|---|
| R5 | −3.65128E−01 | −1.23751E−05 | −1.97575E−08 |
| R12 | 0.00000E+00 | −7.36315E−05 | −1.99659E−07 |

| ASP | A08 | A10 | A12 |
|---|---|---|---|
| R5 | 4.17929E−11 | −2.01566E−13 | 0.00000E+00 |
| R12 | 0.00000E+00 | 0.00000E+00 | 0.00000E+00 |

Regarding the consequent specifications of the projection zoom lens 40 in the fourth specific example, the focal length f in the whole system was f=16.70, 18.00, 19.00 and the F number was FNo=1.49, 1.54, 1.59 in order of the wide angle end, the middle, and the telescopic end. In this case, the half angle of view to was ω=29.95°, 28.13°, and 26.62°.

Moreover, in the case of the projection zoom lens 40 in the fourth specific example, F/F2 in the conditional expression (1) was 0.163, |F1/F2| in the conditional expression (2) was 0.279, F3/F2 in the conditional expression (3) was 0.415, and F/F34 in the conditional expression (4) was 0.263.

Figure 10:
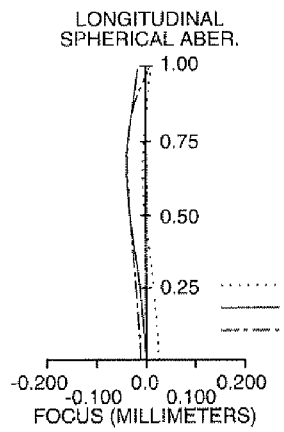
FIGS. 10A to 10C are views showing a spherical aberration, an astigmatism, and a distortion at the wide angle end in a fourth specific example.
FIGS. 10D to 10F are views showing the spherical aberration, the astigmatism, and the distortion at the intermediate focal length.
FIGS. 10G to 10I are views showing the spherical aberration, the astigmatism, and the distortion at the telescopic end.
Figure 10:
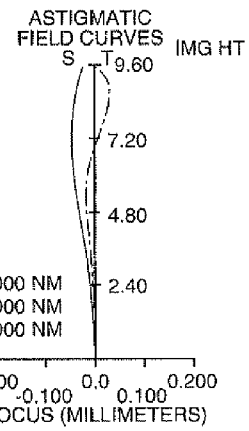
Figure 10:
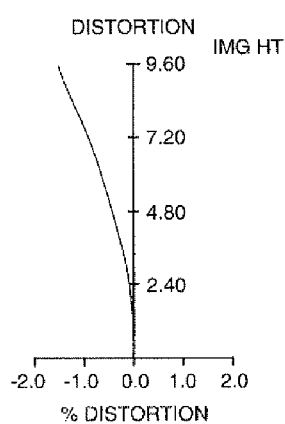
Figure 10:
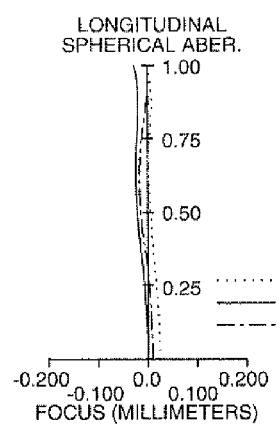
Figure 10:
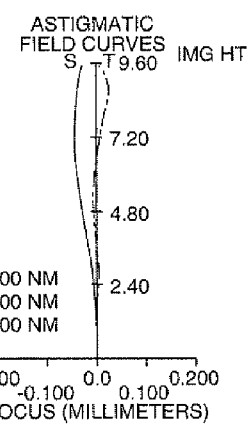
Figure 10:
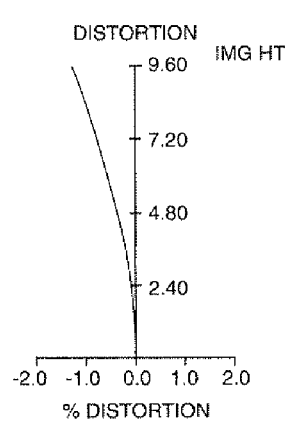
Figure 10:
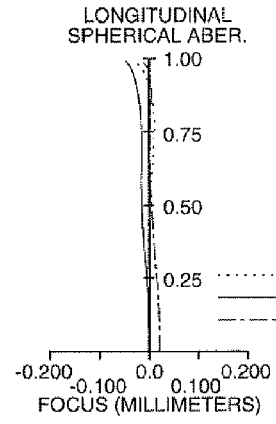
Figure 10:
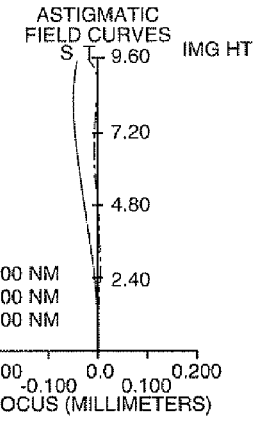
Figure 10:
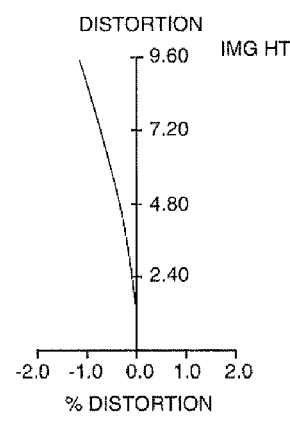

FIGS. 10A to 10C are views showing all kinds of aberrations at the wide angle end in the fourth specific example. The left end of the views showing all kinds of aberrations illustrates a spherical aberration of each color at the reference wavelength of 550 nm and other wavelengths of 610 nm and 460 nm, the middle of the views showing all kinds of aberrations illustrates an astigmatism at the wavelength of 550 nm, and the right end of the views showing all kinds of aberrations illustrates a distortion at the wavelength of 550 nm.

FIGS. 10D to 10F are views showing all kinds of aberrations at the intermediate focal length in the fourth specific example and correspond to FIGS. 10A to 10C, respectively. The left end shows a spherical aberration of each color, the middle shows an astigmatism, and the right end shows a distortion.

FIGS. 10G to 10I are views showing all kinds of aberrations at the telescopic end in the fourth specific example and correspond to FIGS. 10A to 10C, respectively. The left end shows a spherical aberration of each color, the middle shows an astigmatism, and the right end shows a distortion.

(2b) Fifth Specific Example

Figure 11:
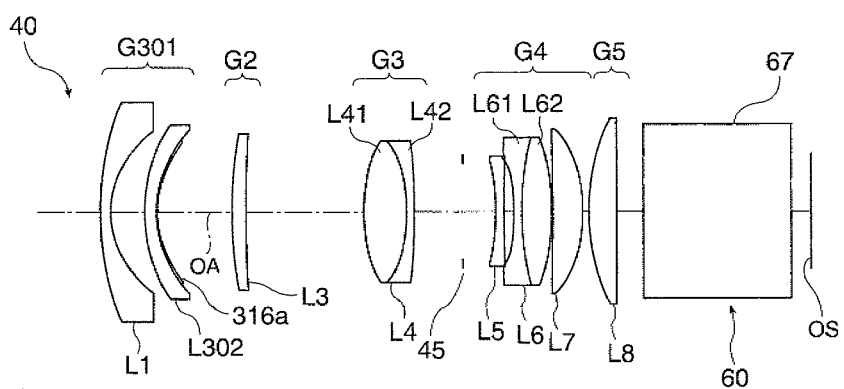
FIGS. 11A and 11B are views explaining the configuration of a projection zoom lens in a fifth specific example of the third embodiment.
Figure 11:
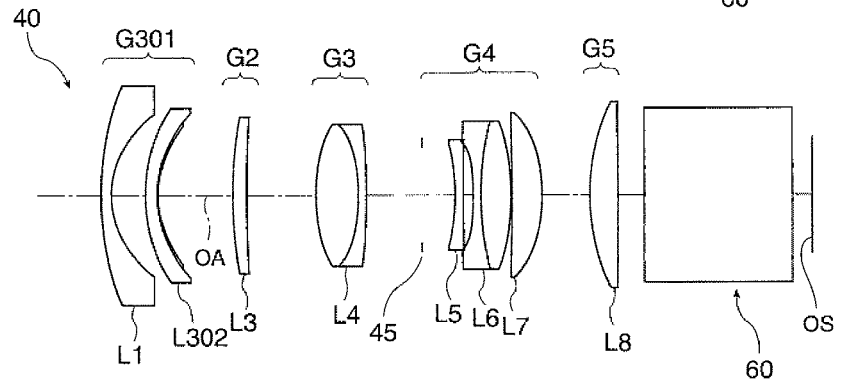

FIGS. 11A and 11B are views showing the specific configuration of the projection zoom lens 40 in a fifth specific example. Basically, the projection zoom lens 40 in the fifth specific example has the same structure as the projection zoom lens 40 in the fourth specific example as the third embodiment, and a detailed explanation thereof will be omitted.

Lens data and the like of the fifth specific example of the projection zoom lens 40 are shown in Table 5. Specifications, such as 'surface number', 'R', 'D', 'Nd', and 'vd', are shown in the upper column of Table 5. Moreover, the values of the distances D5, D7, D10, and D18 at 'wide angle end', 'middle', and 'telescopic end' in the fifth specific example are shown in the middle column of Table 5. In the fifth specific example, the fifth and twelfth surfaces are aspheric surfaces and have the aspheric shapes corresponding to the coefficients 'k' and 'A04' to 'A12' shown in the lower column of Table 5.

TABLE 5

| surface number | R | D | Nd | vd |
|---|---|---|---|---|
| 0 | ∞ | 1500.000 | | |
| 1 | 49.050 | 2.000 | 1.69680 | 55.46 |
| 2 | 17.246 | 6.126 | | |
| 3 | 28.695 | 2.000 | 1.69680 | 55.46 |
| 4 | 20.452 | 0.100 | 1.51468 | 53.40 |
| 5 * | 15.758 | D5 | | |
| 6 | 61.902 | 2.600 | 1.80518 | 25.46 |
| 7 | 208.239 | D7 | | |
| 8 | 28.392 | 7.500 | 1.65844 | 50.85 |
| 9 | −26.511 | 1.500 | 1.74400 | 44.72 |
| 10 | −86.300 | D10 | | |
| aperture | ∞ | 6.000 | | |
| 12 * | −55..258 | 1.400 | 1.74400 | 44.90 |
| 13 | 103.530 | 1.838 | | |
| 14 | −26.500 | 1.500 | 1.84666 | 23.78 |
| 15 | 54.364 | 5.400 | 1.62041 | 60.34 |
| 16 | −37.291 | 0.100 | | |
| 17 | 20457.311 | 5.800 | 1.60311 | 60.69 |
| 18 | −21.556 | D18 | | |
| 19 | 36.592 | 5.000 | 1.71300 | 53.94 |
| 20 | −1000.000 | 5.000 | | |
| 21 | ∞ | 25.750 | 1.51680 | 64.20 |
| 22 | ∞ | 3.350 | | |

| | wide angle end | middle | telescopic end |
|---|---|---|---|
| D5 | 13.424 | 13.271 | 13.665 |
| D7 | 21.392 | 17.110 | 12.629 |
| D10 | 8.558 | 9.223 | 9.795 |
| D18 | 1.000 | 4.769 | 8.284 |

| ASP | k | A04 | A06 |
|---|---|---|---|
| R5 | −5.72100E−01 | −2.17562E−05 | −7.70799E−08 |
| R12 | 0.00000E+00 | −3.89242E−05 | −7.79249E−08 |

| ASP | A08 | A10 | A12 |
|---|---|---|---|
| R5 | 8.26765E−11 | −7.72271E−13 | 0.00000E+00 |
| R12 | 6.92117E−11 | 0.00000E+00 | 0.00000E+00 |

Regarding the consequent specifications of the projection zoom lens 40 in the fifth specific example, the focal length f in the whole system was f=14.20, 15.62, 17.04 and the F number was FNo=1.58, 1.64, 1.71 in order of the wide angle end, the middle, and the telescopic end. In this case, the half angle of view ω was ω=34.50°, 32.00°, and 29.82°.

Moreover, in the case of the projection zoom lens 40 in the fifth specific example, F/F2 in the conditional expression (1) was 0.132, |F1/F2| in the conditional expression (2) was 0.205, F3/F2 in the conditional expression (3) was 0.332, and F/F34 in the conditional expression (4) was 0.287.

FIGS. 12A to 12C are views showing all kinds of aberrations at the wide angle end in the fifth specific example. The left end of the views showing all kinds of aberrations illustrates a spherical aberration of each color at the reference wavelength of 550 nm and other wavelengths of 610 nm and 460 nm, the middle of the views showing all kinds of aberrations illustrates an astigmatism at the wavelength of 550 nm, and the right end of the views showing all kinds of aberrations illustrates a distortion at the wavelength of 550 nm.

FIGS. 12D to 12F are views showing all kinds of aberrations at the intermediate focal length in the fifth specific example and correspond to FIGS. 12A to 12C, respectively. The left end shows a spherical aberration of each color, the middle shows an astigmatism, and the right end shows a distortion.

FIGS. 12G to 12I are views showing all kinds of aberrations at the telescopic end in the fifth specific example and correspond to FIGS. 12A to 12C, respectively. The left end shows a spherical aberration of each color, the middle shows an astigmatism, and the right end shows a distortion.

Fourth Embodiment

FIGS. 13A and 13B show the lens configuration of a projection zoom lens according to a fourth embodiment. FIG. 13A shows the state of the projection zoom lens 40 at the wide angle end, and FIG. 13B shows the state of the projection zoom lens 40 at the telescopic end. The projection zoom lens 40 according to the present embodiment is obtained by changing the projection zoom lens 40 according to the first embodiment shown in FIGS. 1A and 1B, and has the same structure as the projection zoom lens 40 according to the first embodiment in a portion which is not described in particular.

1. Explanation on a Projection Optical System

As shown in FIG. 13A and the like, the projection zoom lens 40 includes a first lens group G401 with negative power, a second lens group G2 with positive power, a third lens group G3 with positive power, a fourth lens group G404 with positive power, and a fifth lens group G5 with positive power in order from the enlargement side toward the reduction side. Here, the second lens group G2, the third lens group G3, and the fifth lens group G5 are the same as those in the projection zoom lens 40 according to the first embodiment, and the lens configuration of the first lens group G401 and the lens configuration of the fourth lens group G404 are different from those in the first embodiment.

The first lens group G301 is formed by three lenses including a first negative meniscus lens L1 which is convex toward the enlargement side, a second negative meniscus lens L421 which is convex toward the enlargement side, and a third negative meniscus lens L422 which is convex toward the enlargement side, in order from the enlargement side (emission side) to the reduction side (incidence side). The lenses L1, L421, and L422 are fixed on the optical axis OA so as not to move at the time of magnification change. Among the lenses, the third negative meniscus lens L422 is a composite aspheric lens in which a thin resin layer is formed on a reduction-side concave surface 416a. Here, the first and second negative meniscus lenses L1 and L421 function as enlargement-side negative lenses, and the third negative meniscus lens L422 functions as a reduction-side negative lens.

The fourth lens group G404 includes a doublet lens L406, which is concave toward the enlargement side and convex toward the reduction side, and a biconvex positive lens L407 in order from the enlargement side (emission side) to the reduction side (incidence side). The lenses L406 and L407 move integrally along the optical axis OA at the time of magnification change. The doublet lens L406 of the lenses is formed by a biconcave negative lens L461, which is disposed at the enlargement side, and a biconvex positive lens L462, which is disposed at the reduction side. In addition, a reduction-side convex surface 416b of the positive lens L462 is an aspheric surface.

2. Specific Example of a Projection Zoom Lens

Lens data and the like of a sixth specific example of the projection zoom lens 40 are shown in Table 6. Specifications, such as 'surface number', 'R', 'D', 'Nd', and 'νd.', are shown in the upper column of Table 6. Moreover, the values of the distances D7, D9, D12, and D18 at 'wide angle end', 'middle', and 'telescopic end' in the sixth specific example are shown in the middle column of Table 6. In the sixth specific example, the seventh and sixteenth surfaces are aspheric surfaces and have the aspheric shapes corresponding to the coefficients 'k' and 'A04' to 'A12' shown in the lower column of Table 6.

TABLE 6

| surface number | | R | D | Nd | νd |
|---|---|---|---|---|---|
| 0 | | ∞ | 1500.000 | | |
| 1 | | 38.496 | 2.000 | 1.62041 | 60.34 |
| 2 | | 20.609 | 3.218 | | |
| 3 | | 25.994 | 2.000 | 1.62041 | 60.34 |
| 4 | | 18.299 | 5.997 | | |
| 5 | | 48.457 | 2.000 | 1.51680 | 64.20 |
| 6 | | 23.477 | 0.050 | 1.51468 | 53.40 |
| 7 | * | 17.190 | D7 | | |
| 8 | | 53.791 | 2.800 | 1.84666 | 23.78 |
| 9 | | 96.062 | D9 | | |
| 10 | | 32.233 | 7.500 | 1.72342 | 37.99 |
| 11 | | −24.503 | 1.700 | 1.71736 | 29.50 |
| 12 | | −171.003 | D12 | | |
| aperture | | ∞ | 10.000 | | |
| 14 | | −16.828 | 1.200 | 1.72825 | 28.32 |
| 15 | | 39.403 | 5.500 | 1.48749 | 70.44 |
| 16 | * | −29.845 | 0.100 | | |
| 17 | | 155.011 | 8.500 | 1.48749 | 70.44 |
| 18 | | −18.977 | D18 | | |
| 19 | | 41.257 | 5.200 | 1.72916 | 54.67 |
| 20 | | −449.547 | 5.000 | | |
| 21 | | ∞ | 25.750 | 1.51680 | 64.20 |
| 22 | | ∞ | 3.350 | | |

| | wide angle end | middle | telescopic end |
|---|---|---|---|
| D7 | 14.086 | 15.122 | 16.518 |
| D9 | 11.962 | 6.526 | 1.000 |
| D12 | 8.413 | 9.115 | 9.568 |
| D18 | 1.000 | 4.698 | 8.375 |

| ASP | k | A04 | A06 |
|---|---|---|---|
| R7 | −8.04420E−01 | −1.30488E−05 | −5.17097E−08 |
| R16 | −8.43272E+00 | −1.35269E−05 | 1.79707E−07 |

| ASP | A08 | A10 | A12 |
|---|---|---|---|
| R7 | 7.85591E−11 | −4.81134E−13 | 0.00000E+00 |
| R16 | −2.30769E−10 | 0.00000E+00 | 0.00000E+00 |

Regarding the consequent specifications of the projection zoom lens 40 in the sixth specific example, the focal length f in the whole system was f=14.20, 15.62, 17.04 and the F number was FNo=1.58, 1.64, 1.70 in order of the wide angle end, the middle, and the telescopic end. In this case, the half angle of view ω was ω=36.95°, 34.35°, and 32.08°.

Moreover, in the case of the projection zoom lens 40 in the sixth specific example, F/F2 in the conditional expression (1) was 0.102, |F1/F2| in the conditional expression (2) was 0.156, F3/F2 in the conditional expression (3) was 0.272, and F/F34 in the conditional expression (4) was 0.301.

FIGS. 14A to 14C are views showing all kinds of aberrations at the wide angle end in the sixth specific example. The left end of the views showing all kinds of aberrations illustrates a spherical aberration of each color at the reference wavelength of 550 nm and other wavelengths of 610 nm and 460 nm, the middle of the views showing all kinds of aberrations illustrates an astigmatism at the wavelength of 550 nm, and the right end of the views showing all kinds of aberrations illustrates a distortion at the wavelength of 550 nm.

FIGS. 14D to 14F are views showing all kinds of aberrations at the intermediate focal length in the sixth specific example and correspond to FIGS. 14A to 14C, respectively. The left end shows a spherical aberration of each color, the middle shows an astigmatism, and the right end shows a distortion.

FIGS. 14G to 14I are views showing all kinds of aberrations at the telescopic end in the sixth specific example and correspond to FIGS. 14A to 14C, respectively. The left end shows a spherical aberration of each color, the middle shows an astigmatism, and the right end shows a distortion.

While the invention has been described with reference to the above embodiments, the invention is not limited to the above-described embodiments and may be implemented in various forms without departing from the scope and spirit of the invention. For example, the following modifications may also be made.

That is, in the above-described embodiments, the liquid crystal light valves 65a, 65b, and 65c are used as image forming devices in the image forming optical unit 60. However, it is also possible to use a light modulator, such as a device in which a pixel is formed by a micromirror, or an image forming unit, such as a film or a slide.

The entire disclosure of Japanese Patent Application No. 2009-032364, filed Feb. 16, 2009 is expressly incorporated by reference herein.

What is claimed is:

1. A projection zoom lens comprising in order from an enlargement side:
    a first lens group with negative power;
    a second lens group with positive power;
    a third lens group with positive power;
    a fourth lens group with positive power; and
    a fifth lens group with positive power,
    wherein the first and fifth lens groups are fixed and the second, third, and fourth lens groups move when zooming from a wide angle side to a telescopic side,
    the second lens group includes only a positive lens which is convex toward the enlargement side, and
    assuming that the focal length at a wide angle end of a whole system including the first to fifth lens groups is F and the focal length of the second lens group is F2, the following conditional expression (1) is satisfied:

$0.05 < F/F2 < 0.23$ (1).

2. The projection zoom lens according to claim 1, wherein the first lens group includes only negative lenses, and at least two, which are convex toward the enlargement side, and
    assuming that the focal length of the first lens group is F1, the following conditional expression (2) is satisfied:

$0.12 < |F1/F2| < 0.30$ (2).

3. The projection zoom lens according to claim 1,
wherein the third lens group includes a doublet lens formed by a biconvex positive lens and a negative lens, and
assuming that the focal length of the third lens group is F3, the following conditional expression (3) is satisfied:

$$0.2<F3/F2<0.5 \quad (3).$$

4. The projection zoom lens according to claim 1,
wherein the fourth lens group includes at least one negative lens and two positive lenses in order from the enlargement side, a surface at the furthest enlargement side being concave toward the enlargement side and a surface at the furthest reduction side being convex toward the reduction side, and
the fourth lens group includes a doublet lens and has at least one aspheric surface.

5. The projection zoom lens according to claim 1,
wherein assuming that the composite focal length of the third and fourth lens groups at the wide angle end is F34, the following conditional expression (4) is satisfied:

$$0.2<F/F34<0.4 \quad (4).$$

6. The projection zoom lens according to claim 1,
wherein among a plurality of negative lenses included in the first lens group, a reduction-side negative lens located at the furthest reduction side is formed including a resin material and has at least one aspheric surface, and
assuming that the composite focal length of an enlargement-side negative lens portion including at least one negative lens, which is disposed closer to the enlargement side than is the reduction-side lens, is Fs and the focal length of the reduction-side negative lens is Fa, the following conditional expression (5) is satisfied:

$$0.2<Fs/Fa<0.5 \quad (5).$$

7. The projection zoom lens according to claim 1, wherein the reduction-side negative lens included in the first lens group is a composite aspheric lens in which a resin layer is formed on a concave optical surface of a spherical lens formed of a glass material.

8. A projection type image display device comprising:
the projection zoom lens according to claim 1; and
an image forming optical unit provided before the projection zoom lens on an optical path.

9. The projection type image display device according to claim 8,
wherein the first lens group includes only negative lenses, and at least two, which are convex toward the enlargement side, and
assuming that the focal length of the first lens group is F1, the following conditional expression (2) is satisfied:

$$0.12<|F1/F2|<0.30 \quad (2).$$

10. The projection type image display device according to claim 8,
wherein the third lens group includes a doublet lens formed by a biconvex positive lens and a negative lens, and
assuming that the focal length of the third lens group is F3, the following conditional expression (3) is satisfied:

$$0.2<F3/F2<0.5 \quad (3).$$

11. The projection type image display device according to claim 8,
wherein the fourth lens group includes at least one negative lens and two positive lenses in order from the enlargement side, a surface at the furthest enlargement side being concave toward the enlargement side and a surface at the furthest reduction side being convex toward the reduction side, and
the fourth lens group includes a doublet lens and has at least one aspheric surface.

12. The projection type image display device according to claim 8,
wherein assuming that the composite focal length of the third and fourth lens groups at the wide angle end is F34, the following conditional expression (4) is satisfied:

$$0.2<F/F34<0.4 \quad (4).$$

13. The projection type image display device according to claim 8,
wherein among a plurality of negative lenses included in the first lens group, a reduction-side negative lens located at the furthest reduction side is formed including a resin material and has at least one aspheric surface, and
assuming that the composite focal length of an enlargement-side negative lens portion including at least one negative lens, which is disposed closer to the enlargement side than is the reduction-side lens, is Fs and the focal length of the reduction-side negative lens is Fa, the following conditional expression (5) is satisfied:

$$0.2<Fs/Fa<0.5 \quad (5).$$

14. The projection type image display device according to claim 8, wherein the reduction-side negative lens included in the first lens group is a composite aspheric lens in which a resin layer is formed on a concave optical surface of a spherical lens formed of a glass material.

* * * * *

UNITED STATES PATENT AND TRADEMARK OFFICE
CERTIFICATE OF CORRECTION

| | |
|---|---|
| PATENT NO. | : 7,855,840 B2 |
| APPLICATION NO. | : 12/698520 |
| DATED | : December 21, 2010 |
| INVENTOR(S) | : Nobutaka Minefuji |

It is certified that error appears in the above-identified patent and that said Letters Patent is hereby corrected as shown below:

In column 25, line 31, in Claim 6, before "lens" insert --negative--.

In column 26, line 38, in Claim 13, before "lens" insert --negative--.

Signed and Sealed this
Thirty-first Day of January, 2012

David J. Kappos
*Director of the United States Patent and Trademark Office*